US012755696B2

(12) United States Patent
Kwon et al.

(10) Patent No.: US 12,755,696 B2
(45) Date of Patent: Oct. 6, 2026

(54) DISPLAY DEVICE AND METHOD OF OPERATING A DISPLAY DEVICE

(71) Applicant: Samsung Display Co., LTD., Yongin-si (KR)

(72) Inventors: Sangan Kwon, Yongin-si (KR); Jihye Kim, Yongin-si (KR); Haneul Kim, Yongin-si (KR); Changnoh Yoon, Yongin-si (KR); Namjeong Kim, Yongin-si (KR); Jiyoun Kim, Yongin-si (KR); Hongsoo Kim, Yongin-si (KR); Sukhun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/020,879

(22) Filed: Jan. 14, 2025

(65) Prior Publication Data

US 2025/0316230 A1 Oct. 9, 2025

(30) Foreign Application Priority Data

Apr. 9, 2024 (KR) ........................ 10-2024-0048333

(51) Int. Cl.
*G09G 3/3233* (2016.01)
*G02F 1/13* (2006.01)
(Continued)

(52) U.S. Cl.
CPC ......... *G09G 3/3233* (2013.01); *G02F 1/1323* (2013.01); *G09G 3/20* (2013.01);
(Continued)

(58) Field of Classification Search
CPC ......... G09G 3/3233; G09G 2300/0861; G09G 2310/08; G09G 2300/0809;
(Continued)

(56) References Cited

U.S. PATENT DOCUMENTS 12,165,567 B2 * 12/2024 Lee ...................... G09G 3/2007
12,315,457 B2 * 5/2025 Hwang .................... G09G 3/32
(Continued)

FOREIGN PATENT DOCUMENTS

KR 10-0711890 B1 4/2007
KR 10-1639977 B1 7/2016
(Continued)

*Primary Examiner* — Dismery Mercedes
(74) *Attorney, Agent, or Firm* — Womble Bond Dickinson (US) LLP

(57) ABSTRACT

A display device according to one or more embodiments of the present disclosure includes: a display panel including a plurality of pixels; and a panel driver configured to drive the display panel, wherein each of the pixels includes: a first light emitting element having a first viewing angle; a second light emitting element having a second viewing angle; a pixel circuit configured to generate a driving current; a first transistor configured to provide the driving current to the first light emitting element in response to a first select signal; and a second transistor configured to provide the driving current to the second light emitting element in response to a second select signal, and wherein, in a mode switching frame period between a first mode and a second mode, the panel driver is configured to sequentially provide the first and second select signals to the pixels on a row-by-row basis.

20 Claims, 16 Drawing Sheets

(51) Int. Cl.
*G09G 3/20* (2006.01)
*G09G 3/32* (2016.01)
*G09G 3/3258* (2016.01)
*G09G 3/36* (2006.01)

(52) U.S. Cl.
CPC ............. *G09G 3/2007* (2013.01); *G09G 3/32* (2013.01); *G09G 3/3258* (2013.01); *G09G 3/3611* (2013.01); *G09G 2300/0809* (2013.01); *G09G 2300/0819* (2013.01); *G09G 2300/0852* (2013.01); *G09G 2300/0861* (2013.01); *G09G 2310/08* (2013.01); *G09G 2320/0271* (2013.01); *G09G 2320/028* (2013.01); *G09G 2320/029* (2013.01); *G09G 2320/0673* (2013.01); *G09G 2320/068* (2013.01); *G09G 2320/0686* (2013.01); *G09G 2358/00* (2013.01); *G09G 2380/10* (2013.01)

(58) Field of Classification Search
CPC ....... G09G 2320/0295; G09G 2380/10; G09G 2330/028; G09G 2320/068; G09G 2320/0686; G09G 3/22; G09G 3/3258; G09G 2320/029; G09G 2358/00; G09G 2320/0613; G09G 2320/062; G09G 3/3275; G09G 3/3611; G09G 2320/0271; G02F 1/1323; G02F 1/134381
See application file for complete search history.

(56) References Cited

U.S. PATENT DOCUMENTS

| | | | | |
|---|---|---|---|---|
| 12,475,852 | B2 * | 11/2025 | Lee | G09G 3/3241 |
| 12,518,702 | B2 * | 1/2026 | Kim | G09G 3/3233 |
| 2018/0293963 | A1 * | 10/2018 | Kim | B60W 50/00 |
| 2019/0179180 | A1 * | 6/2019 | Chung | G02F 1/1323 |
| 2021/0240021 | A1 * | 8/2021 | Hsieh | G02F 1/1334 |
| 2021/0272985 | A1 * | 9/2021 | Kim | H10D 86/441 |
| 2022/0399529 | A1 * | 12/2022 | Shin | G09G 3/3258 |
| 2024/0257769 | A1 * | 8/2024 | Kim | G09G 3/3233 |
| 2024/0420640 | A1 * | 12/2024 | Hwang | G09G 3/32 |
| 2025/0174180 | A1 * | 5/2025 | Choi | G09G 3/3233 |
| 2025/0218383 | A1 * | 7/2025 | Yun | G09G 3/3258 |

FOREIGN PATENT DOCUMENTS

| | | | |
|---|---|---|---|
| KR | 10-2021-0069152 | A | 6/2021 |
| KR | 10-2022-0043779 | A | 4/2022 |
| KR | 10-2590013 | B1 | 10/2023 |

* cited by examiner

DISPLAY DEVICE AND METHOD OF OPERATING A DISPLAY DEVICE

CROSS-REFERENCE TO RELATED APPLICATION(S)

The present application claims priority to and the benefit of Korean Patent Application No. 10-2024-0048333, filed on Apr. 9, 2024, in the Korean Intellectual Property Office, the entire disclosure of which is incorporated herein by reference.

BACKGROUND

1. Field

Aspects of the present disclosure relate to a display device and a method of operating the display device.

2. Description of the Related Art

In general, a display device may display an image with a wide viewing angle such that, not only a user positioned in front of the display device, but also a user positioned on the side of the display device can view the image. However, recently, to protect personal information or to ensure safety in a display device mounted in a vehicle, a privacy mode (or a private mode) has been developed in which the display device displays an image only to a user located in front of the display device. For example, a vehicle display device located corresponding to a passenger seat of a vehicle may operate not only in a public mode in which an image is displayed with a wide viewing angle such that the image is provided to both of a driver and a passenger, but also in a privacy mode in which an image is displayed with a narrow viewing angle such that the image is provided only to the passenger.

The above information disclosed in this Background section is only for enhancement of understanding of the background of the invention and therefore it may contain information that does not form the prior art.

SUMMARY

Aspects of embodiments of the present disclosure are directed to a display device capable of providing seamless mode switching.

Aspects of some embodiments of the present disclosure are directed to a method of operating a display device capable of providing seamless mode switching.

According to some embodiments of the present disclosure, there is provided a display device including: a display panel including a plurality of pixels; and a panel driver configured to drive the display panel, wherein each of the plurality of pixels includes: a first light emitting element having a first viewing angle; a second light emitting element having a second viewing angle different from the first viewing angle; a pixel circuit configured to generate a driving current; a first transistor configured to provide the driving current to the first light emitting element in response to a first select signal; and a second transistor configured to provide the driving current to the second light emitting element in response to a second select signal, and wherein, in a mode switching frame period between a first mode and a second mode, the panel driver is configured to sequentially provide the first select signal and the second select signal to the plurality of pixels on a row-by-row basis.

In some embodiments, the first mode may be a public mode in which an image displayed by the display device is visible to both of a first user positioned in front of the display device and a second user positioned on a side of the display device, and the second mode may be a privacy mode in which an image displayed by the display device is visible to the first user and not visible to the second user.

In some embodiments, the first light emitting element may be a public light emitting element of which light is provided to both of a first user positioned in front of the display device and a second user positioned at a side of the display device, and the second light emitting element may be a privacy light emitting element of which light is provided to the first user and is not provided to the second user.

In some embodiments, in the first mode, the panel driver may be configured to generate first data voltages for the plurality of pixels based on first gamma reference voltages corresponding to the first mode, and, in the second mode, the panel driver may be configured to generate second data voltages for the plurality of pixels based on second gamma reference voltages corresponding to the second mode.

In some embodiments, in the mode switching frame period in which a mode of the display device is switched from the first mode to the second mode, the panel driver may be configured to generate the second data voltages for the plurality of pixels based on the second gamma reference voltages corresponding to the second mode.

In some embodiments, in the mode switching frame period in which a mode of the display device is switched from the second mode to the first mode, the panel driver may be configured to generate the first data voltages for the plurality of pixels based on the first gamma reference voltages corresponding to the first mode.

In some embodiments, in a case where a driving frequency for the display panel is greater than or equal to a reference driving frequency, in the mode switching frame period, the panel driver may be configured to provide a black data voltage to the plurality of pixels such that both of the first light emitting element and the second light emitting element of each of the plurality of pixels do not emit light.

In some embodiments, in the mode switching frame period in which a mode of the display device is switched from the first mode to the second mode, the panel driver may be configured to generate second data voltages based on second gamma reference voltages corresponding to the second mode, to sequentially provide the second data voltages to the plurality of pixels on the row-by-row basis, to sequentially provide the first select signal having an off-level to the plurality of pixels on the row-by-row basis, and to sequentially provide the second select signal having an on-level to the plurality of pixels on the row-by-row basis.

In some embodiments, in the mode switching frame period in which a mode of the display device is switched from the second mode to the first mode, the panel driver may be configured to generate first data voltages based on first gamma reference voltages corresponding to the first mode, to sequentially provide the first data voltages to the plurality of pixels on the row-by-row basis, to sequentially provide the first select signal having an on-level to the plurality of pixels on the row-by-row basis, and to sequentially provide the second select signal having an off-level to the plurality of pixels on the row-by-row basis.

In some embodiments, in the first mode, the first select signal may be maintained at an on-level, and the second select signal may be maintained at an off-level, and, in the second mode, the first select signal may be maintained at the off-level, and the second select signal may be maintained at the on-level.

In some embodiments, the pixel circuit may include: a third transistor including a gate, a first terminal connected to a first power supply voltage line, and a second terminal; a fourth transistor including a gate connected to a write signal line, a first terminal connected to a data line, and a second terminal; a first capacitor including a first electrode connected to the first power supply voltage line, and a second electrode connected to the second terminal of the fourth transistor; a second capacitor including a first electrode connected to the second terminal of the fourth transistor, and a second electrode connected to the gate of the fourth transistor; a fifth transistor including a gate connected to a compensation signal line, a first terminal connected to the second terminal of the third transistor, and a second terminal connected to the gate of the third transistor; a sixth transistor including a gate connected to an initialization signal line, a first terminal connected to the gate of the third transistor, and a second terminal connected to an initialization voltage line; a seventh transistor including a gate connected to the compensation signal line, a first terminal connected to the first electrode of the second capacitor, and a second terminal connected to a reference voltage line; an eighth transistor including a gate connected to an emission signal line, a first terminal connected to the second terminal of the third transistor, and a second terminal connected to the first and second transistors; a ninth transistor including a gate connected to a bypass signal line, a first terminal connected to the first light emitting element, and a second terminal connected to an anode initialization voltage line; and a tenth transistor including a gate connected to the bypass signal line, a first terminal connected to the second light emitting element, and a second terminal connected to the anode initialization voltage line, wherein the first transistor may include a gate connected to a first select signal line which transfers the first select signal, a first terminal connected to the second terminal of the eighth transistor, and a second terminal connected to the first light emitting element, and wherein the second transistor may include a gate connected to a second select signal line which transfers the second select signal, a first terminal connected to the second terminal of the eighth transistor, and a second terminal connected to the second light emitting element.

In some embodiments, the panel driver may include: a gamma reference voltage generator configured to generate first gamma reference voltages in the first mode, and to generate second gamma reference voltages in the second mode; a data driver configured to sequentially provide first data voltages generated based on the first gamma reference voltages to the plurality of pixels on the row-by-row basis in the first mode, and to sequentially provide second data voltages generated based on the second gamma reference voltages to the plurality of pixels on the row-by-row basis in the second mode; a scan driver configured to sequentially provide scan signals to the plurality of pixels on the row-by-row basis in each of the first mode and the second mode; a first select driver configured to provide the first select signal having an on-level to the plurality of pixels in the first mode, and to provide the first select signal having an off-level to the plurality of pixels in the second mode; a second select driver configured to provide the second select signal having the off-level to the plurality of pixels in the first mode, and to provide the second select signal having the on-level to the plurality of pixels in the second mode; and a controller configured to control the gamma reference voltage generator, the data driver, the scan driver, the first select driver and the second select driver.

In some embodiments, in the mode switching frame period in which a mode of the display device is switched from the first mode to the second mode, the data driver may be configured to sequentially provide the second data voltages generated based on the second gamma reference voltages to the plurality of pixels on the row-by-row basis, the first select driver may be configured to sequentially provide the first select signal having the off-level to the plurality of pixels on the row-by-row basis, and the second select driver may be configured to sequentially provide the second select signal having the on-level to the plurality of pixels on the row-by-row basis.

In some embodiments, in the mode switching frame period in which a mode of the display device is switched from the second mode to the first mode, the data driver may be configured to sequentially provide the first data voltages generated based on the first gamma reference voltages to the plurality of pixels on the row-by-row basis, the first select driver may be configured to sequentially provide the first select signal having the on-level to the plurality of pixels on the row-by-row basis, and the second select driver may be configured to sequentially provide the second select signal having the off-level to the plurality of pixels on the row-by-row basis.

In some embodiments, the display device may be a vehicle display device mounted in a vehicle.

According to some embodiments of the disclosure, there is provided a display panel including a plurality of pixels; a gamma reference voltage generator configured to generate first gamma reference voltages in a first mode, and to generate second gamma reference voltages in a second mode; a data driver configured to sequentially provide first data voltages generated based on the first gamma reference voltages to the plurality of pixels on a row-by-row basis in the first mode, and to sequentially provide second data voltages generated based on the second gamma reference voltages to the plurality of pixels on the row-by-row basis in the second mode; a scan driver configured to sequentially provide scan signals to the plurality of pixels on the row-by-row basis in each of the first mode and the second mode; a first select driver configured to provide a first select signal having an on-level to the plurality of pixels in the first mode, and to provide the first select signal having an off-level to the plurality of pixels in the second mode; a second select driver configured to provide a second select signal having the off-level to the plurality of pixels in the first mode, and to provide the second select signal having the on-level to the plurality of pixels in the second mode; and a controller configured to control the gamma reference voltage generator, the data driver, the scan driver, the first select driver, and the second select driver, wherein each of the plurality of pixels includes: a first light emitting element having a first viewing angle; a second light emitting element having a second viewing angle different from the first viewing angle; a pixel circuit configured to generate a driving current; a first transistor configured to provide the driving current to the first light emitting element in response to the first select signal; and a second transistor configured to provide the driving current to the second light emitting element in response to the second select signal, and wherein, in a mode switching frame period between the first mode and the second mode, the first select driver is configured to sequentially provide the first select signal to the plurality of pixels on the row-by-row basis, and the second select driver is configured to sequentially provide the second select signal to the plurality of pixels on the row-by-row basis.

In some embodiments, in the mode switching frame period in which a mode of the display device is switched from the first mode to the second mode, the gamma reference voltage may be configured to generate the second gamma reference voltages, the data driver may be configured to sequentially provide the second data voltages generated based on the second gamma reference voltages to the plurality of pixels on the row-by-row basis, the first select driver may be configured to sequentially provide the first select signal having the off-level to the plurality of pixels on the row-by-row basis, and the second select driver may be configured to sequentially provide the second select signal having the on-level to the plurality of pixels on the row-by-row basis.

In some embodiments, in the mode switching frame period in which a mode of the display device is switched from the second mode to the first mode, the gamma reference voltage may be configured to generate the first gamma reference voltages, the data driver may be configured to sequentially provide the first data voltages generated based on the first gamma reference voltages to the plurality of pixels on the row-by-row basis, the first select driver may be configured to sequentially provide the first select signal having the on-level to the plurality of pixels on the row-by-row basis, and the second select driver may be configured to sequentially provide the second select signal having the off-level to the plurality of pixels on the row-by-row basis.

In some embodiments, in a case where a driving frequency for the display panel is greater than or equal to a reference driving frequency, in the mode switching frame period in which a mode of the display device may be switched from the first mode to the second mode, the gamma reference voltage may be configured to generate the second gamma reference voltages, the data driver may be configured to sequentially provide a black data voltage to the plurality of pixels on the row-by-row basis, the first select driver may be configured to sequentially provide the first select signal having the off-level to the plurality of pixels on the row-by-row basis, and the second select driver may be configured to sequentially provide the second select signal having the on-level to the plurality of pixels on the row-by-row basis, and, in a case where the driving frequency for the display panel is greater than or equal to the reference driving frequency, in the mode switching frame period in which the mode of the display device is switched from the second mode to the first mode, the gamma reference voltage is configured to generate the first gamma reference voltages, the data driver may be configured to sequentially provide the black data voltage to the plurality of pixels on the row-by-row basis, the first select driver may be configured to sequentially provide the first select signal having the on-level to the plurality of pixels on the row-by-row basis, and the second select driver may be configured to sequentially provide the second select signal having the off-level to the plurality of pixels on the row-by-row basis.

According to some embodiments of the disclosure, there is provided a method of operating a display device in which each of a plurality of pixels includes a first light emitting element and a second light emitting element having different viewing angles, is configured to drive the first light emitting element based on a first select signal, and is configured to drive the second light emitting element based on a second select signal, the method including: determining whether a mode of the display device is switched; generating second gamma reference voltages corresponding to a second mode in a first mode switching frame period in which a mode of the display device is switched from a first mode to the second mode; sequentially providing second data voltages generated based on the second gamma reference voltages to the plurality of pixels on a row-by-row basis in the first mode switching frame period; sequentially providing the first select signal having an off-level to the plurality of pixels on the row-by-row basis in the first mode switching frame period; sequentially providing the second select signal having an on-level to the plurality of pixels on the row-by-row basis in the first mode switching frame period; generating first gamma reference voltages corresponding to the first mode in a second mode switching frame period in which the mode of the display device is switched from the second mode to the first mode; sequentially providing first data voltages generated based on the first gamma reference voltages to the plurality of pixels on the row-by-row basis in the second mode switching frame period; sequentially providing the first select signal having the on-level to the plurality of pixels on the row-by-row basis in the second mode switching frame period; and sequentially providing the second select signal having the off-level to the plurality of pixels on the row-by-row basis in the second mode switching frame period.

As described above, in a display device and a method of operating the display device according to embodiments, each of a plurality of pixels may include a first light emitting element and a second light emitting element having different viewing angles, may drive the first light emitting element based on a first select signal, and may drive the second light emitting element based on a second select signal. Further, in a mode switching frame period between a first mode (e.g., a public mode) and a second mode (e.g., a privacy mode), a panel driver may sequentially provide the first select signal and the second select signal to the plurality of pixels on a row-by-row basis. Accordingly, blinking between the first and second modes may be prevented or substantially reduced, and suitably seamless mode switching may be performed.

BRIEF DESCRIPTION OF THE DRAWINGS

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

DETAILED DESCRIPTION

Figure 1:
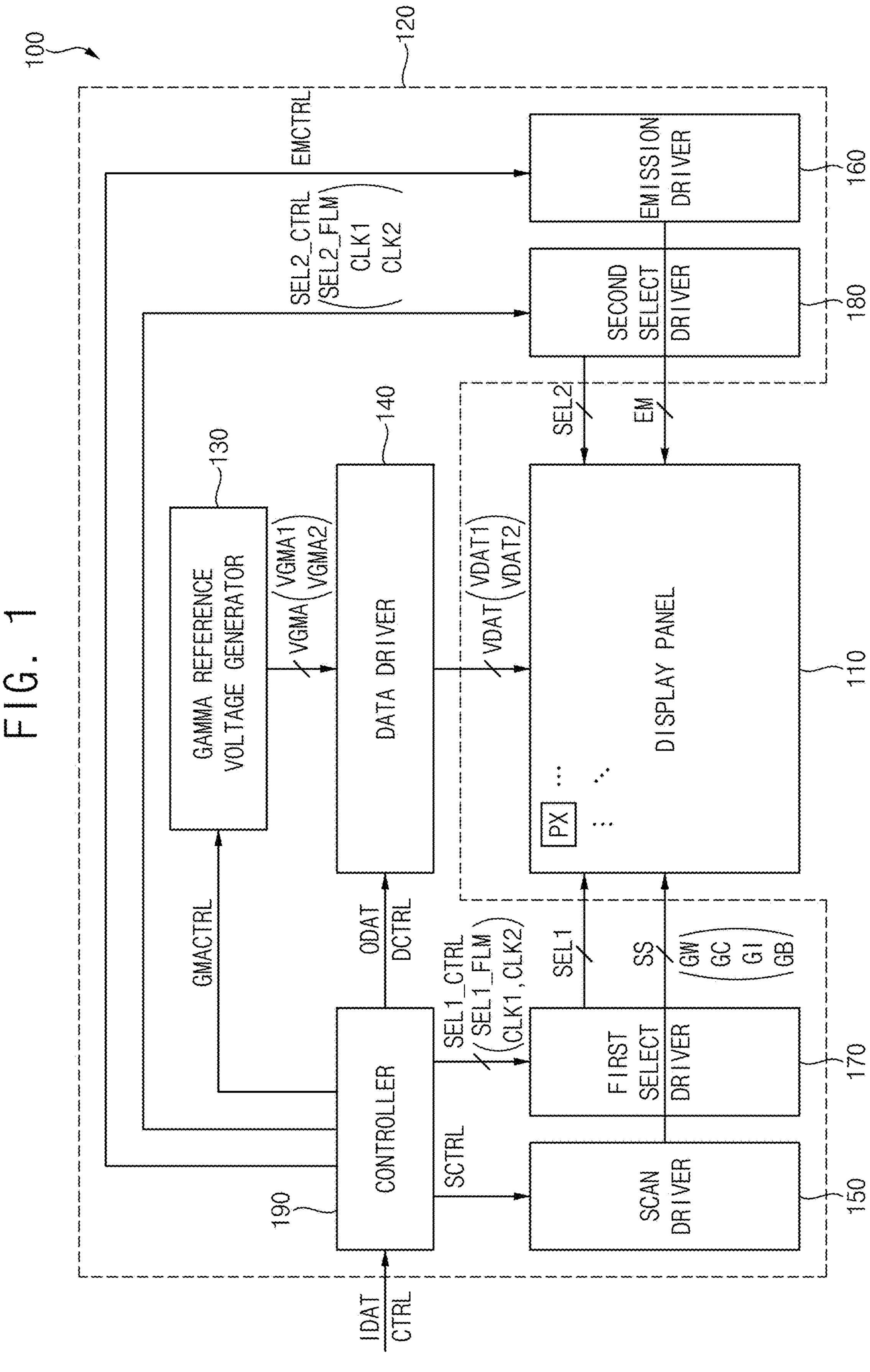
FIG. 1 is a block diagram illustrating a display device according to some embodiments of the present disclosure.

The embodiments are described more fully hereinafter with reference to the accompanying drawings. Like or similar reference numerals refer to like or similar elements throughout.

Figure 2:
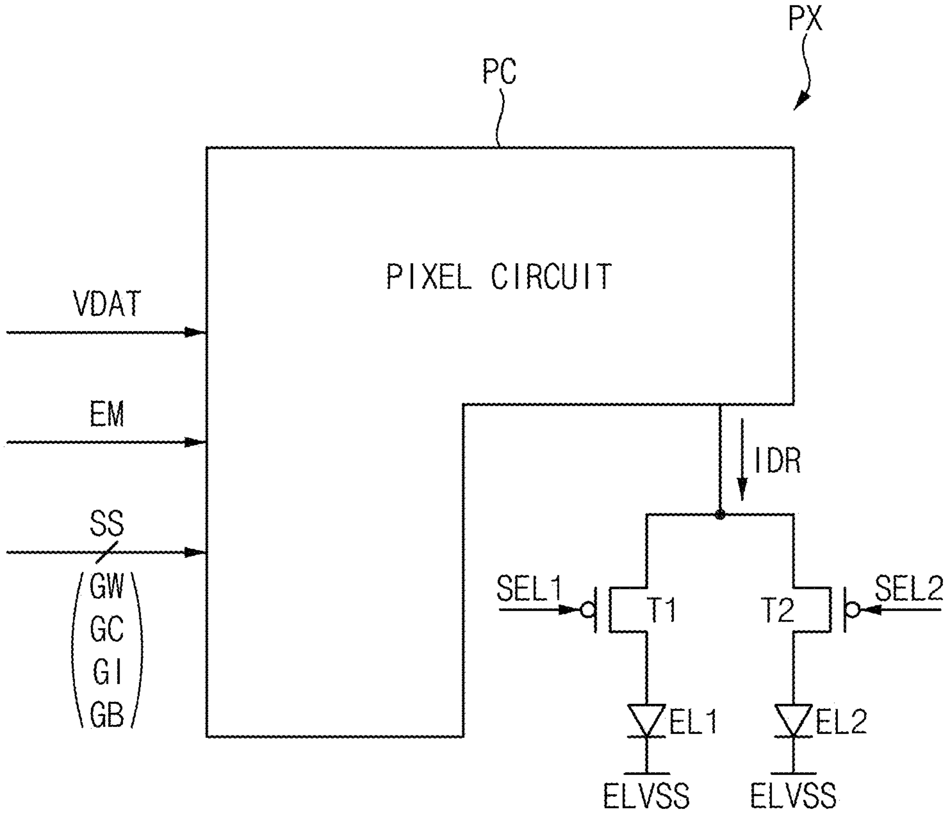
FIG. 2 is a diagram illustrating a pixel included in a display device according to some embodiments of the present disclosure.
Figure 3A:
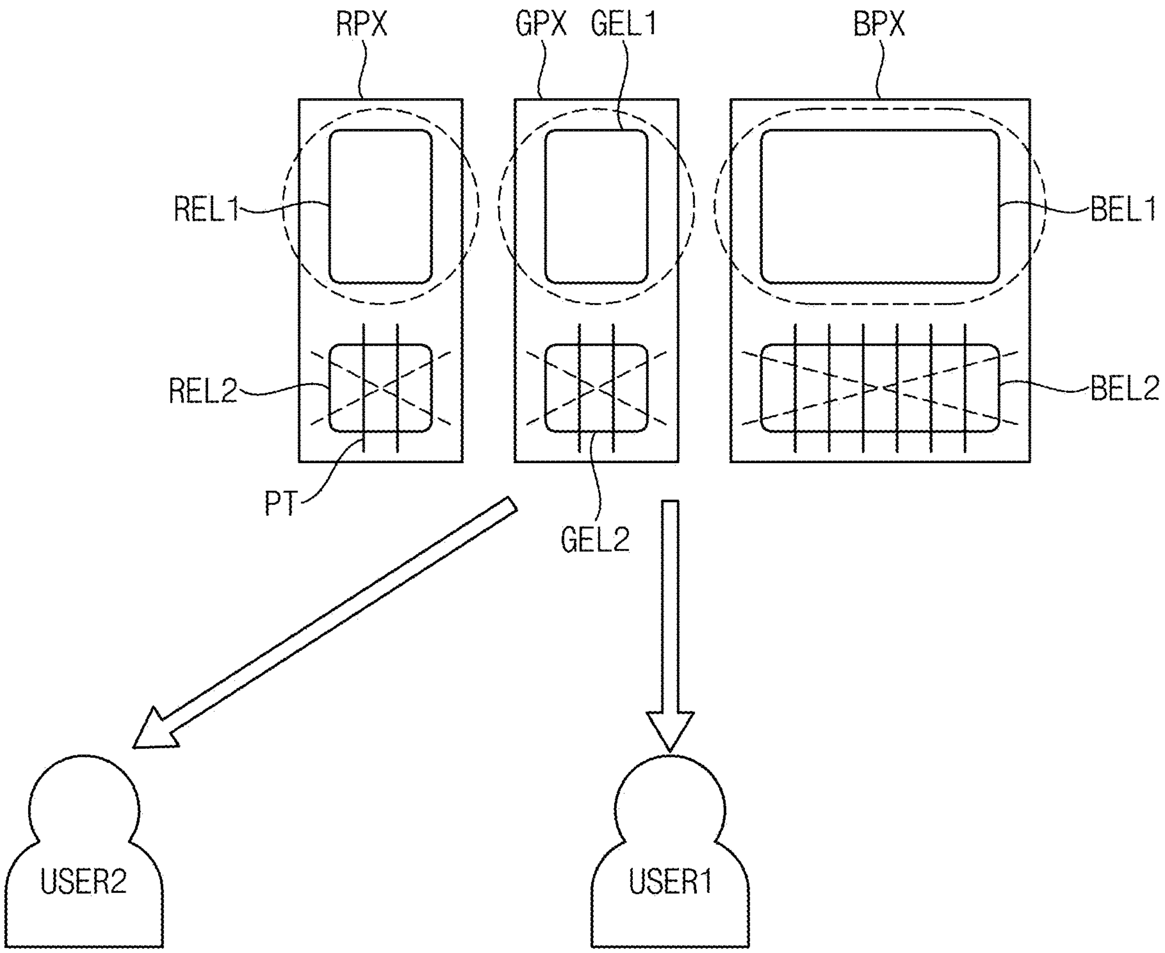
FIG. 3A is a diagram illustrating an example of a first mode in which first light emitting elements emit light and second light emitting elements do not emit light, according to some embodiments of the present disclosure.
Figure 3B:
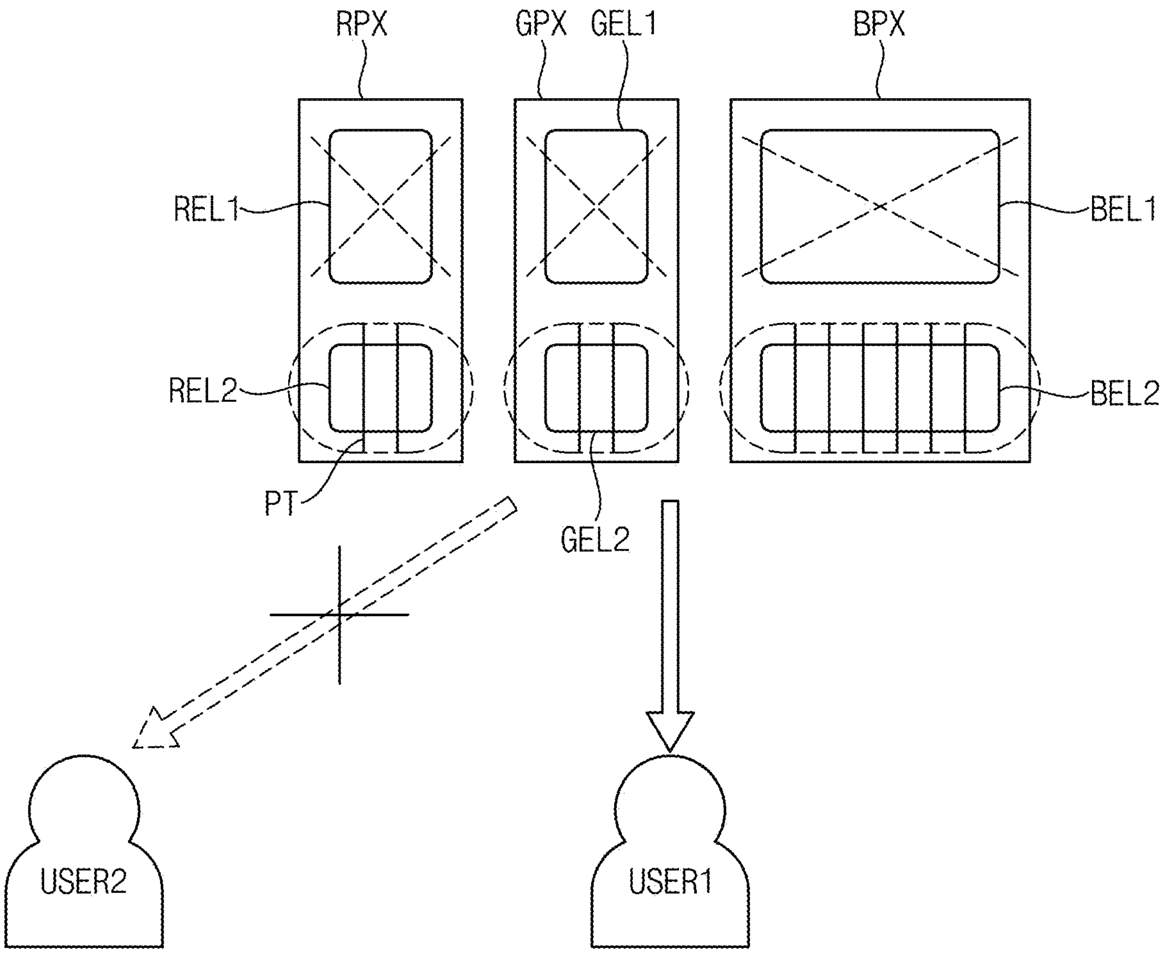
FIG. 3B is a diagram illustrating an example of a second mode in which the first light emitting elements do not emit light and the second light emitting elements emit light, according to some embodiments of the present disclosure.
Figure 4:
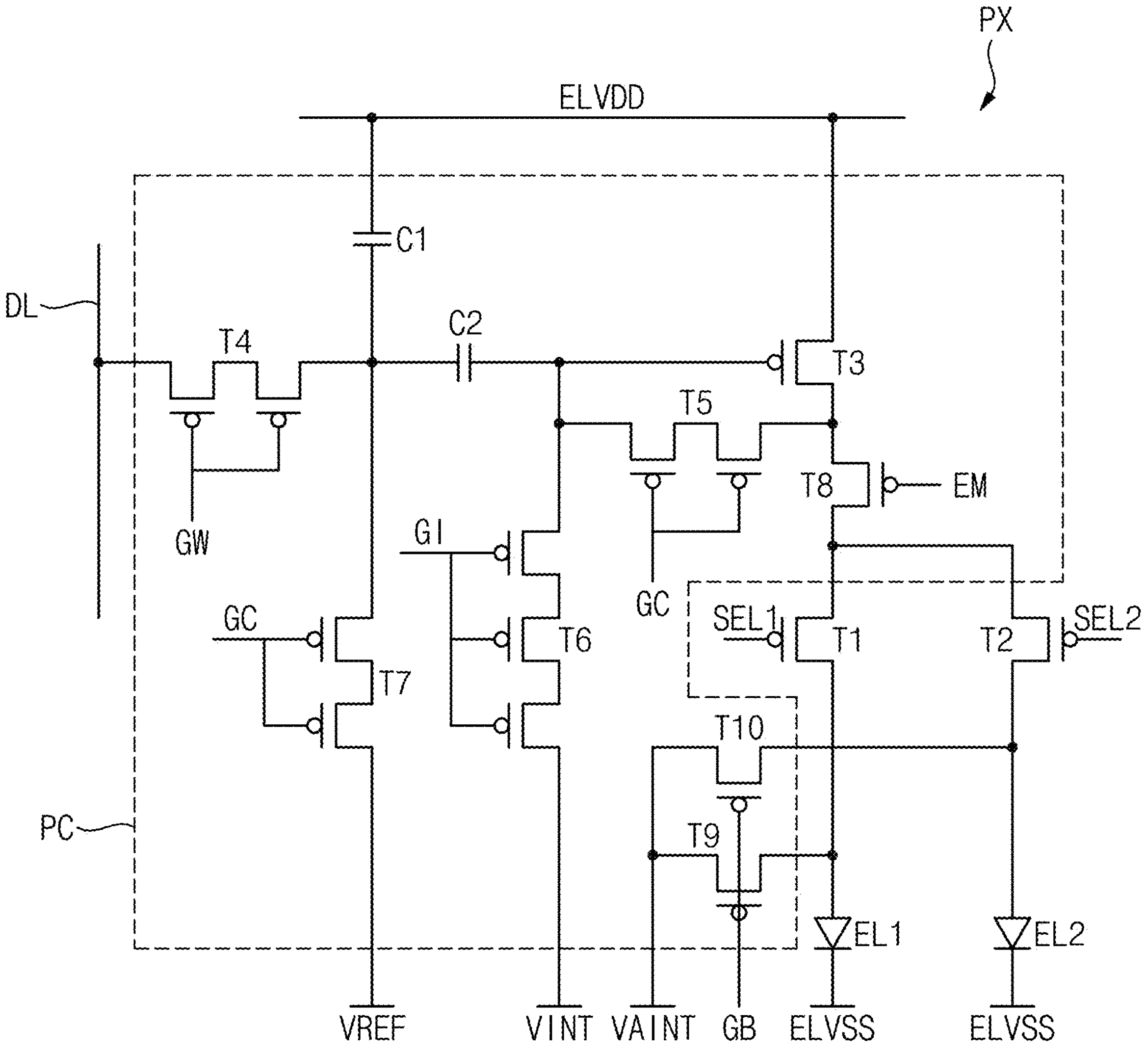
FIG. 4 is a circuit diagram illustrating an example of a pixel included in a display device according to some embodiments of the present disclosure.
Figure 5:
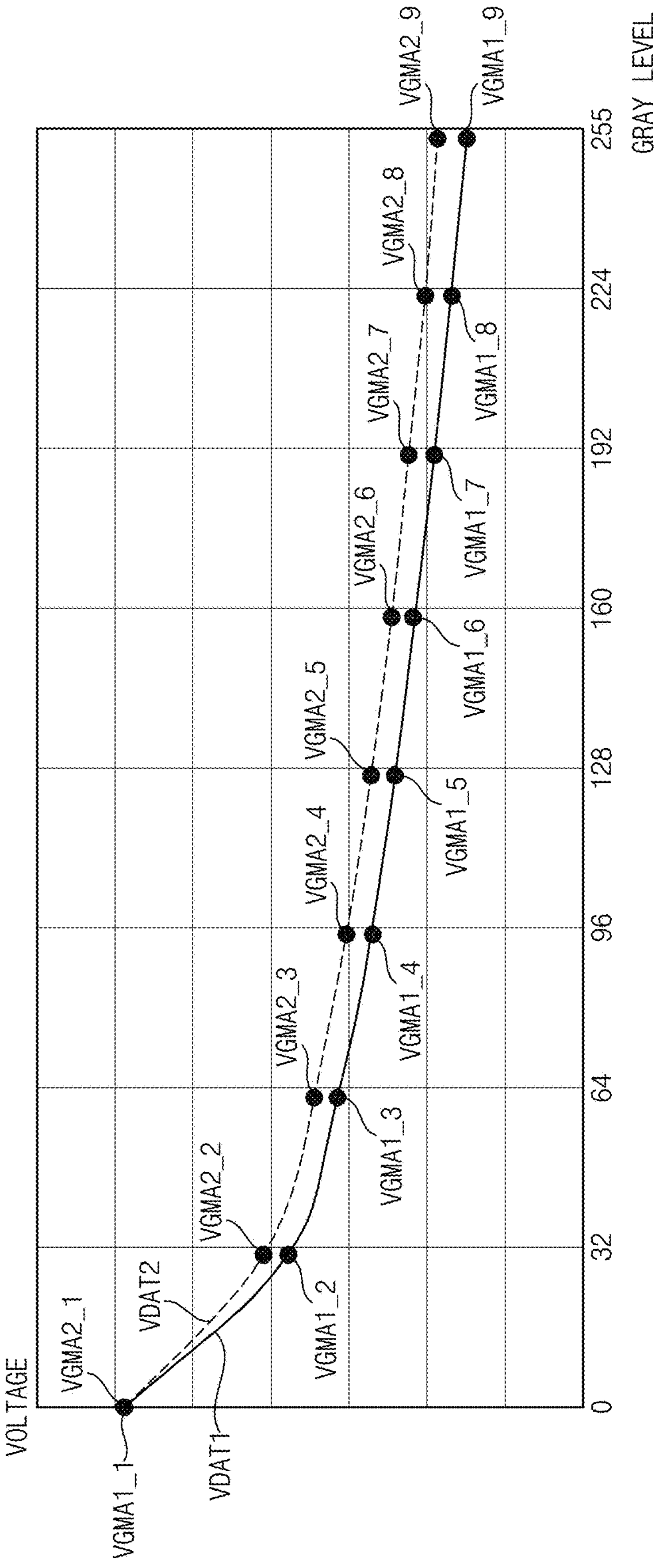
FIG. 5 is a diagram illustrating examples of first gamma reference voltages generated in a first mode and second gamma reference voltages generated in a second mode, according to some embodiments of the present disclosure.
Figure 6:
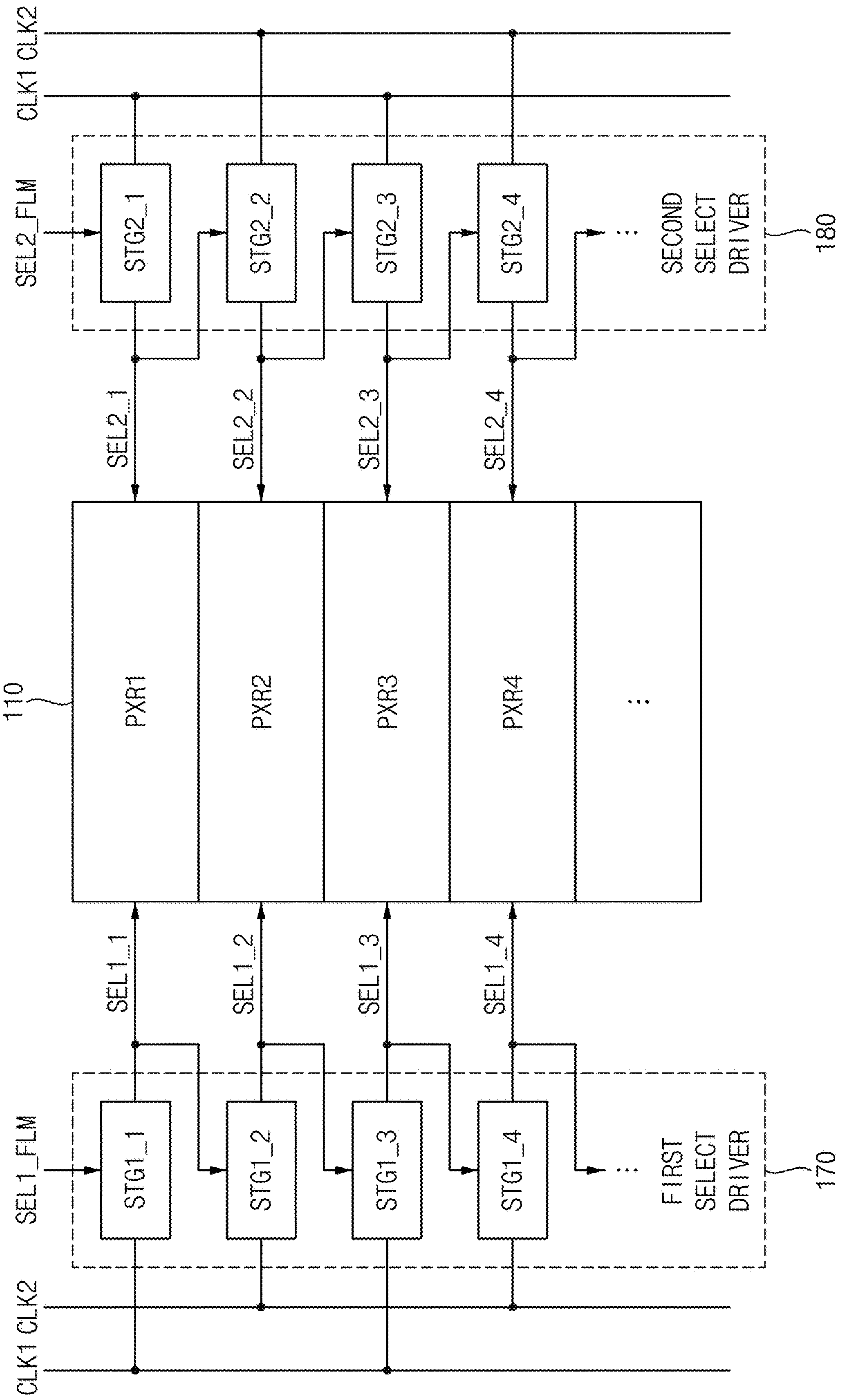
FIG. 6 is a block diagram illustrating examples of a first select driver and a second select driver included in a display device according to some embodiments of the present disclosure.
Figure 7:
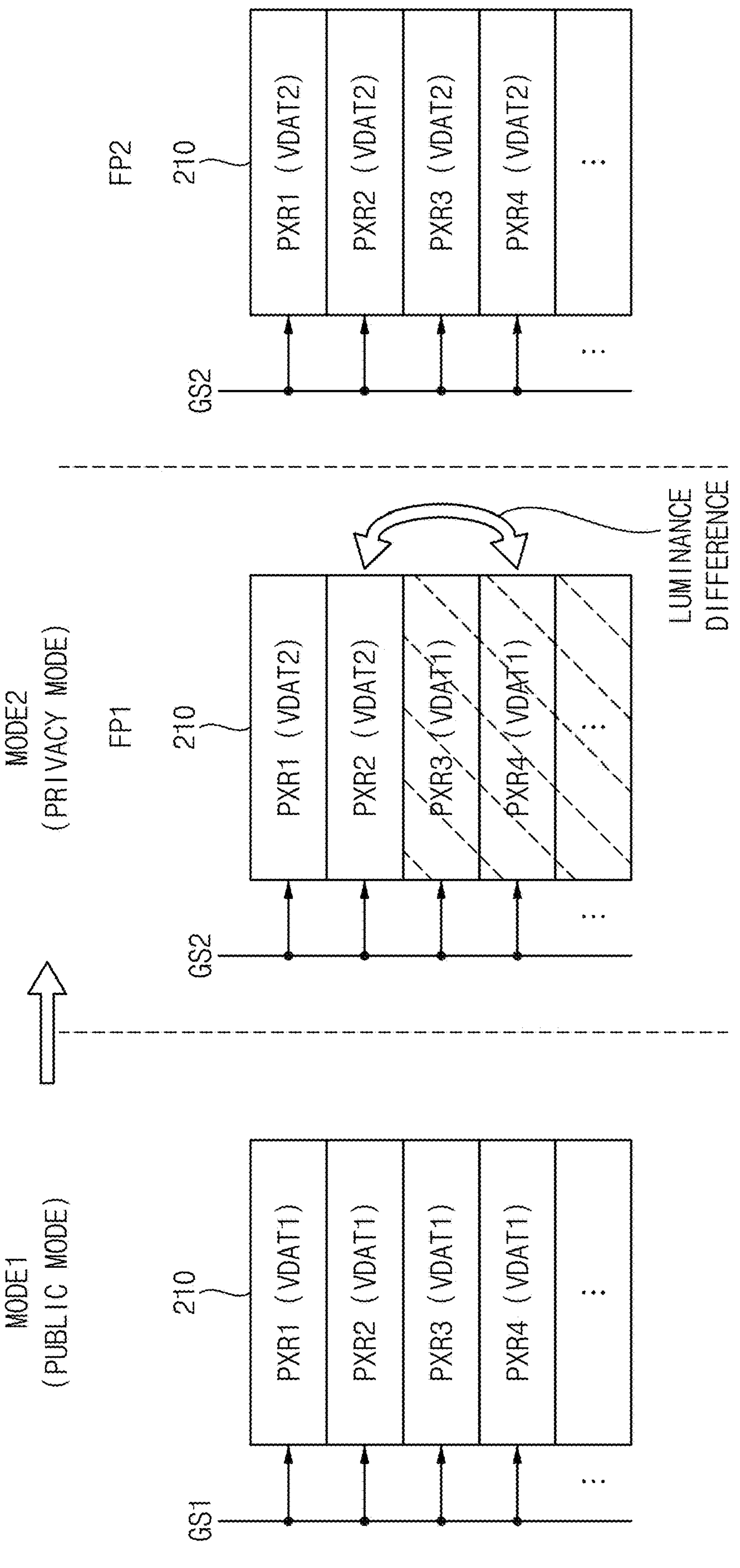
FIG. 7 is a diagram illustrating an example of a luminance difference that occurs when a mode of a display device is switched from a first mode to a second mode in a case where first and second global signals are used instead of first and second select signals according to some embodiments of the present disclosure.
Figure 8:
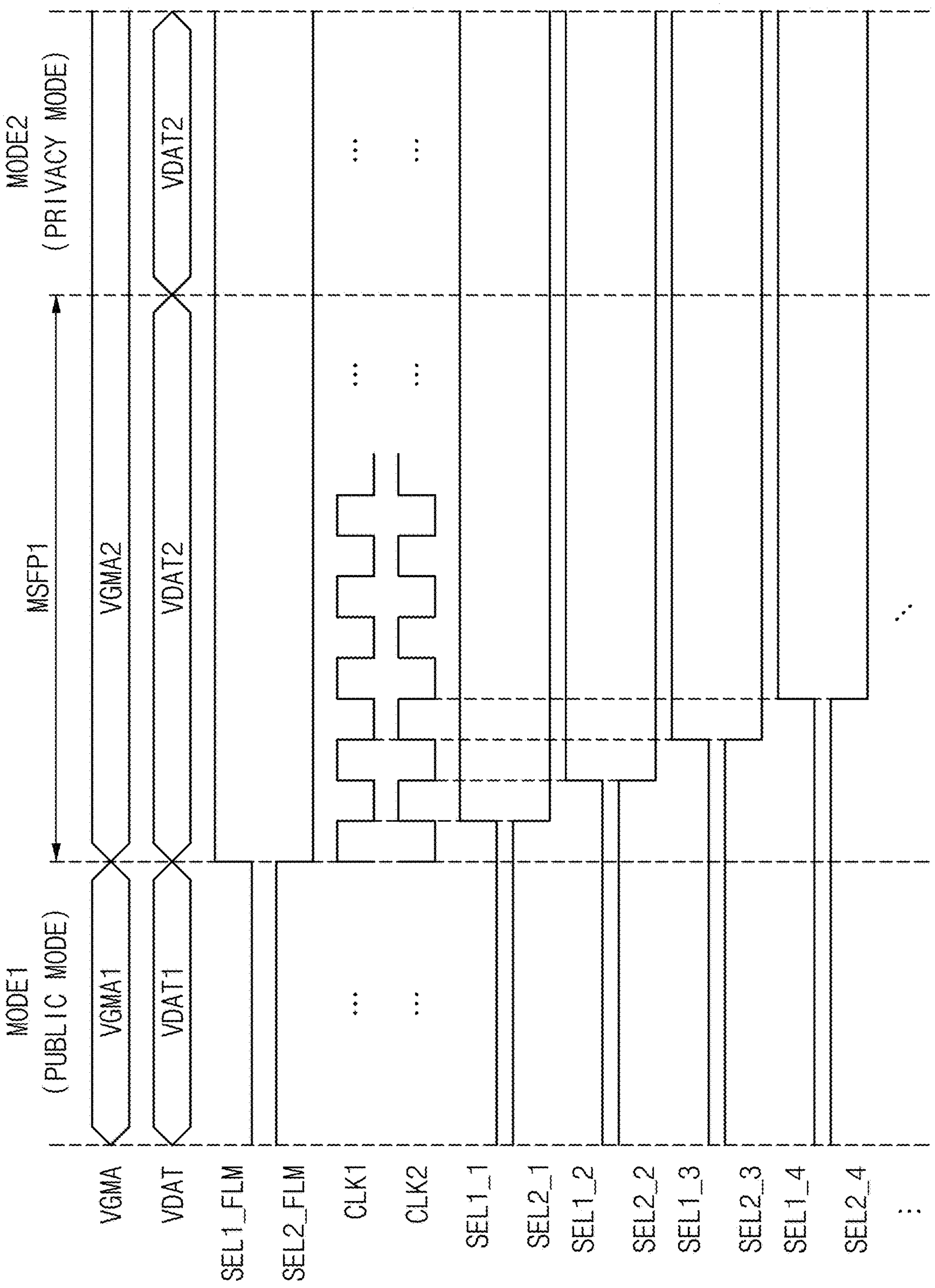
FIG. 8 is a timing diagram illustrating examples of first and second select signals in a mode switching frame period when a mode of a display device according to some embodiments of the present disclosure is switched from a first mode to a second mode.
Figure 9:
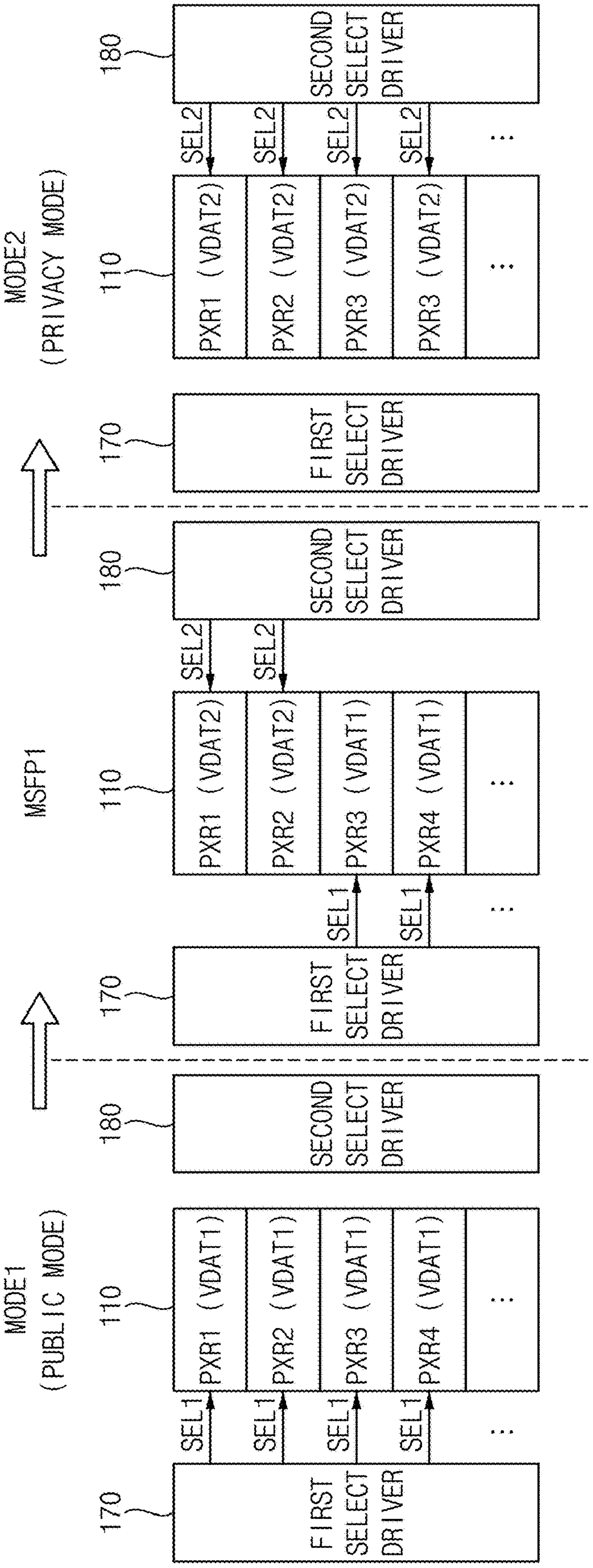
FIG. 9 is a diagram illustrating an example of an operation of a display device in a mode switching frame period when a mode of the display device is switched from a first mode to a second mode according to some embodiments of the present disclosure.
Figure 10:
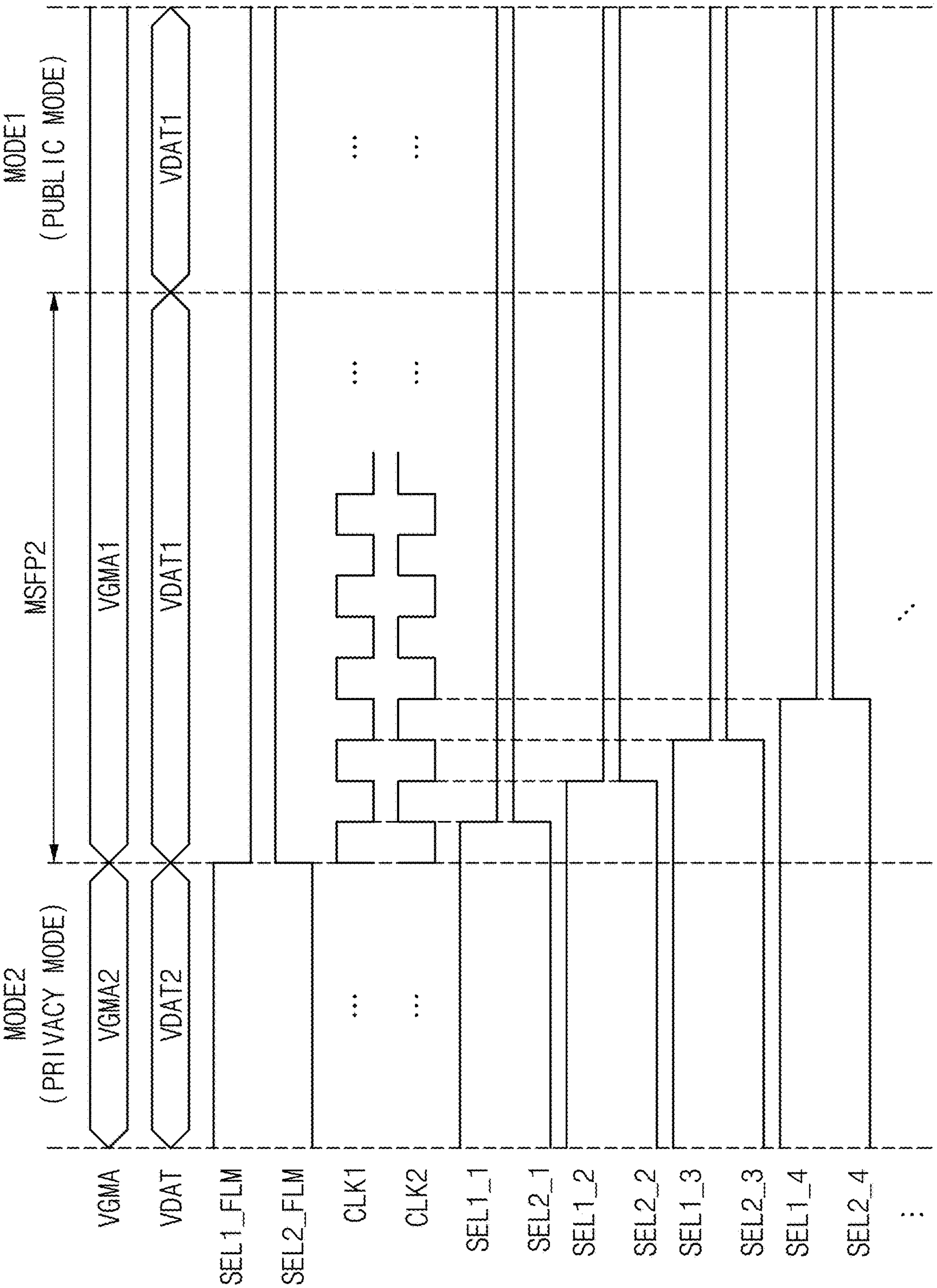
FIG. 10 is a timing diagram illustrating examples of first and second select signals in a mode switching frame period when a mode of a display device is switched from a second mode to a first mode according to some embodiments of the present disclosure.
Figure 11:
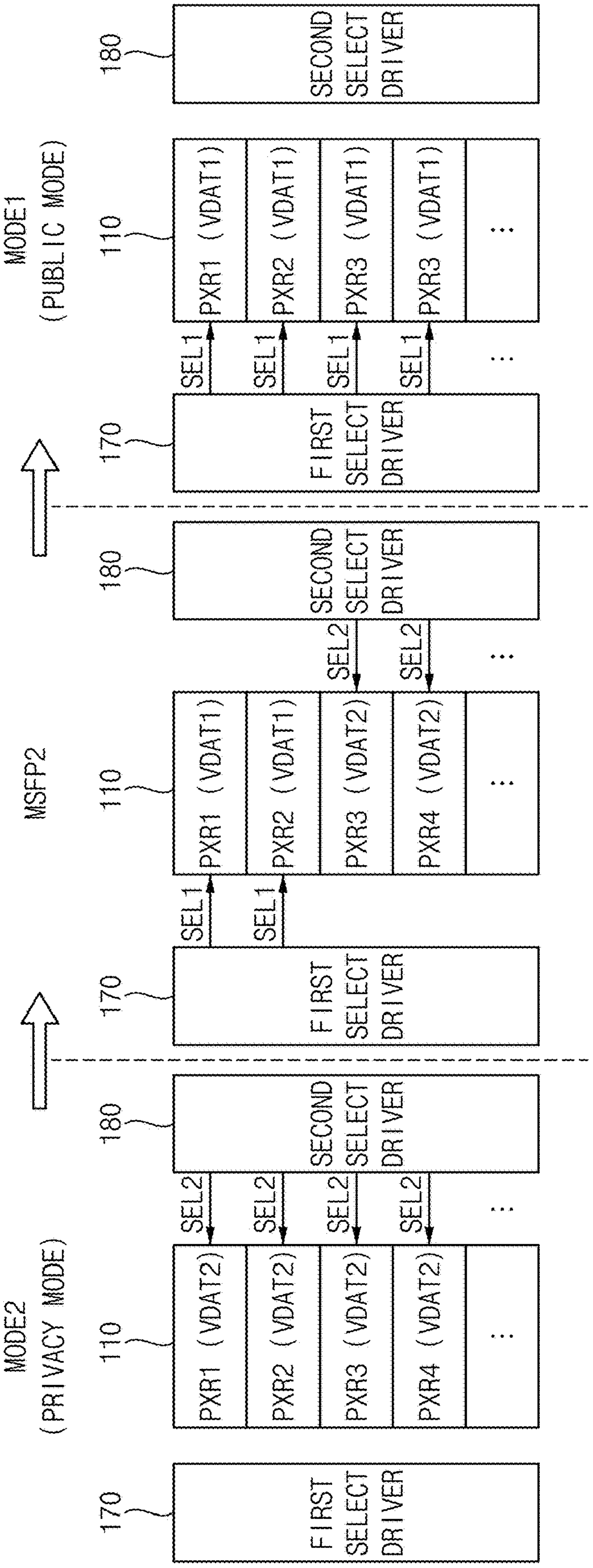
FIG. 11 is a diagram illustrating an example of an operation of a display device in a mode switching frame period when a mode of the display device is switched from a second mode to a first mode according to some embodiments of the present disclosure.

FIG. 1 is a block diagram illustrating a display device according to some embodiments of the present disclosure, FIG. 2 is a diagram illustrating a pixel included in a display device according to some embodiments of the present disclosure, FIG. 3A is a diagram illustrating an example of a first mode in which first light emitting elements emit light and second light emitting elements do not emit light, according to some embodiments of the present disclosure, FIG. 3B is a diagram illustrating an example of a second mode in which the first light emitting elements do not emit light and the second light emitting elements emit light, according to some embodiments of the present disclosure, FIG. 4 is a circuit diagram illustrating an example of a pixel included in a display device according to some embodiments of the present disclosure, FIG. 5 is a diagram illustrating examples of first gamma reference voltages generated in a first mode and second gamma reference voltages generated in a second mode according to some embodiments of the present disclosure, FIG. 6 is a block diagram illustrating examples of a first select driver and a second select driver included in a display device according to some embodiments of the present disclosure, FIG. 7 is a diagram illustrating an example of a luminance difference that occurs when a mode of a display device is switched from a first mode to a second mode in a case where first and second global signals are used instead of first and second select signals according to some embodiments of the present disclosure, FIG. 8 is a timing diagram illustrating examples of first and second select signals in a mode switching frame period when a mode of a display device according to some embodiments of the present disclosure is switched from a first mode to a second mode, FIG. 9 is a diagram illustrating an example of an operation of a display device in a mode switching frame period when a mode of the display device is switched from a first mode to a second mode. according to some embodiments of the present disclosure, FIG. 10 is a timing diagram illustrating examples of first and second select signals in a mode switching frame period when a mode of a display device is switched from a second mode to a first mode according to some embodiments of the present disclosure, and FIG. 11 is a diagram illustrating an example of an operation of a display device in a mode switching frame period when a mode of the display device is switched from a second mode to a first mode, according to some embodiments of the present disclosure.

Referring to FIG. 1, a display device 100 according to some embodiments may include a display panel 110 that includes a plurality of pixels PX, and a panel driver 120 that drives the display panel 110. In some embodiments, the panel driver 120 may include a gamma reference voltage generator 130 that generates gamma reference voltages VGMA, a data driver 140 that provides data voltages VDAT to the plurality of pixels PX based on the gamma reference voltages VGMA, a scan driver 150 that provides scan signals SS to the plurality of pixels PX, an emission driver 160 that provides emission signals EM to the plurality of pixels PX, a first select driver 170 that provides a first select signal SEL1 to the plurality of pixels PX, a second select driver 180 that provides a second select signal SEL2 to the plurality of pixels PX, and a controller 190 that controls the gamma reference voltage generator 130, the data driver 140, the scan driver 150, the emission driver 160, the first select driver 170 and the second select driver 180.

The display panel 110 may include a plurality of data lines, a plurality of scan lines, a plurality of emission signal lines, a plurality of first select signal lines, a plurality of second select signal lines, and the plurality of pixels PX connected thereto. In some embodiments, as illustrated in FIG. 2, each of the plurality of pixels PX may include a first light emitting element EL1, a second light emitting element EL2, a pixel circuit PC, a first transistor T1, and a second transistor T2.

The first light emitting element EL1 may have a first viewing angle, and the second light emitting element EL2 may have a second viewing angle different from the first viewing angle. In some embodiments, the first viewing angle may be a relatively wide viewing angle, and the second viewing angle may be a relatively narrow viewing angle. Further, in some embodiments, the first light emitting element EL1 may be a public light emitting element, of which light is provided to both of a first user positioned in front of the display device 100 and a second user positioned at a side of the display device 100, and the second light emitting element EL2 may be a privacy light emitting element, of which light is provided to the first user but not to the second user.

For example, as illustrated in FIGS. 3A and 3B, the plurality of pixels PX may include a red pixel RPX, a green pixel GPX and a blue pixel BPX. The red pixel RPX may include a first red light emitting element REL1 having a wide viewing angle and a second red light emitting element REL2 having a narrow viewing angle. The green pixel GPX may include a first green light emitting element GEL1 having a wide viewing angle and a second green light emitting element GEL2 having a narrow viewing angle. The blue pixel BPX may include a first blue light emitting element BEL1 having a wide viewing angle and a second blue light emitting element BEL2 having a narrow viewing angle. For example, each of the first red light emitting element REL1, the first green light emitting element GEL1, and the first blue light emitting element BEL1 may correspond to the first light emitting element EL1 illustrated in FIG. 2, and each of the second red light emitting element REL2, the second green light emitting element GEL2, and the second blue light emitting element BEL2 may correspond to the second light emitting element EL2 illustrated in FIG. 2. Further, in order to have the narrow viewing angle, each of the second red, green, and blue light emitting elements REL2, GEL2 and BEL2 may include an emitting layer, and one or more light control layers PT for preventing or substantially reducing light emitted by the emitting layer from spreading laterally.

In some embodiments, in a first mode of the display device 100, the panel driver 120 may drive the display panel 110 such that the first light emitting elements EL1 of the plurality of pixels PX emit light and the second light emitting elements EL2 of the plurality of pixels PX do not emit light. For example, in the first mode, as illustrated in FIG. 3A, the first red, green, and blue light emitting elements REL1, GEL1, and BEL1 having the wide viewing angle may emit light. The light emitted by the first red, green, and blue light emitting elements REL1, GEL1, and BEL1 may be provided to both of the first user USER1 positioned in front of the display device 100 and the second user USER2 positioned at the side of the display device 100, and an image displayed by the display device 100 may be viewed by both of the first user USER1 and the second user USER2. For example, the first mode, in which the display panel 110 is driven such that the first red, green, and blue light emitting elements REL1, GEL1, and BEL1 have the wide viewing angle emit light, may be referred to as a public mode, in which the image displayed by the display device 100 is visible to both of the first user USER1 positioned in front of the display device 100 and the second user USER2 positioned at the side of the display device 100.

In a second mode of the display device 100, the panel driver 120 may drive the display panel 110 such that the first light emitting elements EL1 of the plurality of pixels PX do not emit light and the second light emitting elements EL2 of the plurality of pixels PX emit light. For example, in the second mode, as illustrated in FIG. 3B, the first red, green, and blue light emitting elements REL1, GEL1, and BEL1 having the wide viewing angle may not emit light, and the second red, green and blue light emitting elements REL2, GEL2, and BEL2 having the narrow viewing angle may emit light. Light emitted by the second red, green, and blue light emitting elements REL2, GEL2, and BEL2 may be provided to the first user USER1 positioned in front of the display device 100, but may not be provided to the second user USER2 positioned at the side of the display device 100. Thus, an image displayed by the display device 100 may be visible to the first user USER1, but may be invisible to the second user USER2. For example, the second mode in which the display panel 110 is driven such that the first red, green, and blue light emitting elements REL1, GEL1, and BEL1 having the wide viewing angle do not emit light and the second red, green, and blue light emitting elements REL2, GEL2, and BEL2 having the narrow viewing angle emit light, may be referred to as a privacy mode, in which the image displayed by the display device 100 is visible to the first user USER1 positioned in front of the display device 100, but is invisible to the second user USER2 positioned at the side of the display device 100.

In some embodiments, the display device 100 may be a vehicle display device mounted in a vehicle. For example, the display device 100 may be located corresponding to the passenger seat of the vehicle, the first user USER1 may be a passenger seated on the passenger seat, and the second user USER2 may be a driver seated on a driver seat, but the present disclosure is not limited thereto. Further, when the vehicle is stopped, or when a gear of the vehicle is in a parking mode or a neutral mode, the display device 100 may operate in the first mode, or the public mode, and the image displayed by the display device 100 may be visible to both of the passenger and the driver. For example, when the vehicle is in a moving state, or when the gear of the vehicle is in a drive mode or a reverse mode, the display device 100 may operate in the second mode, or the privacy mode, and the image displayed by the display device 100 may be visible to the passenger, but may not be visible to the driver.

Further, in some embodiments, each of the first and second light emitting elements EL1 and EL2 may be, but is not limited to, an organic light emitting diode (OLED). In some other embodiments, each of the first and second light emitting elements EL1 and EL2 may be any suitable light emitting element. For example, each of the first and second light emitting elements EL1 and EL2 may be a micro light emitting diode, a nano light emitting diode (NED), a quantum dot (QD) light emitting diode, an inorganic light emitting diode, or any other suitable light emitting element. For example, as illustrated in FIG. 4, in some embodiments, the first light emitting element EL1 may include an anode connected to the first transistor T1, and a cathode connected to a second power supply voltage line which transfers a second power supply voltage ELVSS (e.g., a low power supply voltage). In some embodiments, the second light emitting element EL2 may include an anode connected to the second transistor T2, and a cathode connected to the second power supply voltage line.

For example, as illustrated in FIG. 2, the pixel circuit PC may generate a driving current IDR based on the data voltage VDAT, the emission signal EM, and the scan signals SS. In some embodiments, the scan signals SS provided to the pixel circuit PC may include, but are not limited to, a write signal GW, a compensation signal GC, an initialization signal GI, and a bypass signal GB. Further, in some embodiments, as illustrated in FIG. 4, the pixel PX may include the first light emitting element EL1, the second light emitting element EL2, the first transistor T1, the second transistor T2, and the pixel circuit PC. The pixel circuit PC may include a third transistor T3, a fourth transistor T4, a first capacitor C1, a second capacitor C2, a fifth transistor T5, a sixth transistor T6, a seventh transistor T7, an eighth transistor T8, a ninth transistor T9, and a tenth transistor T10.

The third transistor T3 may be a driving transistor that generates the driving current IDR. In some embodiments, the third transistor T3 may include a gate connected to the second capacitor C2, a first terminal connected to a first power supply voltage line which transfers transmits a first power supply voltage ELVDD (e.g., a high power supply voltage), and a second terminal connected to the fifth and eighth transistors T5 and T8.

The fourth transistor T4 may transfer the data voltage VDAT of the data line DL to the first and second capacitors C1 and C2 in response to the write signal GW. In some embodiments, the fourth transistor T4 may include a gate connected to a write signal line which transfers the write signal GW, a first terminal connected to the data line DL, and a second terminal connected to the first and second capacitors C1 and C2.

The first capacitor C1 may store the data voltage VDAT transferred through the fourth transistor T4. For example, the first capacitor C1 may be a storage capacitor. In some embodiments, the first capacitor C1 may include a first electrode connected to the first power supply voltage line, and a second electrode connected to the second terminal of the fourth transistor T4.

The second capacitor C2 may be connected between the second electrode of the first capacitor C1 and the gate of the third transistor T3. For example, the second capacitor C2 may be a hold capacitor. In some embodiments, the second capacitor C2 may include a first electrode connected to the second terminal of the fourth transistor T4 and the second electrode of the first capacitor C1, and a second electrode connected to the gate of the fourth transistor T4. Thus, when a voltage of the first electrode of the second capacitor C2 changes from a reference voltage VREF to the data voltage VDAT, a voltage of the second electrode of the second capacitor C2 also may change by a voltage difference between the reference voltage VREF and the data voltage VDAT (e.g., from a voltage obtained by subtracting an absolute value of a threshold voltage of the third transistor T3 from the first power supply voltage ELVDD).

The fifth transistor T5 may diode-connect the third transistor T3 in response to the compensation signal GC. For example, when the third transistor T3 is diode-connected, the voltage at the second electrode of the second capacitor C2 may be changed (e.g., from an initialization voltage VINT) to the voltage obtained by subtracting the absolute value of the threshold voltage of the third transistor T3 from the first power supply voltage ELVDD. This operation may be referred to as a threshold voltage compensation operation, and may be performed before the data voltage VDAT is transferred by the fourth transistor T4. In some embodiments, the fifth transistor T5 may include a gate connected to a compensation signal line which transfers the compensation signal GC, a first terminal connected to the second terminal of the third transistor T3, and a second terminal connected to the gate of the third transistor T3.

The sixth transistor T6 may transfer the initialization voltage VINT to the gate of the third transistor T3 and the second electrode of the second capacitor C2 in response to the initialization signal GI. In some embodiments, the sixth transistor T6 may include a gate connected to an initialization signal line which transfers the initialization signal GI, a first terminal connected to the gate of the third transistor T3 and the second electrode of the second capacitor C2, and a second terminal connected to an initialization voltage line which transfers the initialization voltage VINT.

The seventh transistor T7 may transfer the reference voltage VREF to the second electrode of the first capacitor C1 and the first electrode of the second capacitor C2 in response to the compensation signal GC. In some embodiments, the seventh transistor T7 may include a gate connected to the compensation signal line, a first terminal connected to the second electrode of the first capacitor C1 and the first electrode of the second capacitor C2, and a second terminal connected to a reference voltage line which transfers the reference voltage VREF.

The eighth transistor T8 may connect the third transistor T3 to the first and second transistors T1 and T2 in response to the emission signal EM. In some embodiments, the eighth transistor T8 may include a gate connected to the emission signal line which transfers the emission signal EM, a first terminal connected to the second terminal of the third transistor T3, and a second terminal connected to the first and second transistors T1 and T2.

The ninth transistor T9 may provide an anode initialization voltage VAINT to the first light emitting element EL1 in response to the bypass signal GB, and the tenth transistor T10 may provide the anode initialization voltage VAINT to the second light emitting element EL2 in response to the bypass signal GB. In some embodiments, the ninth transistor T9 may include a gate connected to a bypass signal line which transfers the bypass signal GB, a first terminal connected to the first light emitting element EL1, and a second terminal connected to an anode initialization voltage line which transfers the anode initialization voltage VAINT. In some embodiments, the tenth transistor T10 may include a gate connected to the bypass signal line, a first terminal connected to the second light emitting element EL2, and a second terminal connected to the anode initialization voltage line.

In some embodiments, as illustrated in FIG. 4, the first through tenth transistors T1 through T10 may be P-type metal-oxide-semiconductor (PMOS) transistors. In some other embodiments, at least one of the first through tenth transistors T1 through T10 may be an N-type metal-oxide-semiconductor (NMOS) transistor. For example, the first, second, third, eighth, ninth and tenth transistors T1, T2, T3, T8, T9 and T10 may be PMOS transistors, and the fourth, fifth, sixth and seventh transistors T4, T5, T6 and T7 may be NMOS transistors, but are not limited thereto.

Further, in some embodiments, at least one of the first through tenth transistors T1 through T10 may include a plurality of sub-transistors connected in series. For example, as illustrated in FIG. 4, the fourth, fifth and seventh transistors T4, T5 and T7 may include two sub-transistors connected in series, and the sixth transistor T6 may include three sub-transistors connected in series, but are not limited thereto. In a case where the fourth, fifth, sixth and seventh transistors T4, T5, T6 and T7, each of which one terminal is connected to the first and/or second capacitors C1 and C2 include the plurality of sub-transistors connected in series, a leakage current through the fourth, fifth, sixth and seventh transistors T4, T5, T6 and T7 may be reduced, and a distortion of voltages stored in the first and/or second capacitors C1 and C2 may be prevented or reduced.

Although FIG. 4 illustrates an example in which the pixel circuit PC includes the third through tenth transistors T3 through T10 and the first and second capacitors C1 and C2, the pixel circuit PC of the pixel PX of the display device 100 according to embodiments is not limited to the example of FIG. 4, and may have any circuit configuration that generates the driving current IDR.

Referring again to FIG. 2, the first transistor T1 may provide the driving current IDR generated by the pixel circuit PC to the first light emitting element EL1 in response to the first select signal SEL1, and the second transistor T2 may provide the driving current IDR generated by the pixel circuit PC to the second light emitting element EL2 in response to the second select signal SEL2. In some embodiments, the first transistor T1 may include a gate connected to a first select signal line which transfers the first select signal SEL1, a first terminal connected to the second terminal of the eighth transistor T8, and a second terminal connected to the first light emitting element EL1. In some embodiments, the second transistor T2 may include a gate connected to a second select signal line which transfers the second select signal SEL2, a first terminal connected to the second terminal of the eighth transistor T8, and a second terminal connected to the second light emitting element EL2.

In some embodiments, in the first mode (e.g., the public mode), the first select signal SEL1 may be maintained at an on-level (e.g., a low level) and the second select signal SEL2 may be maintained at an off-level (e.g., a high level). Thus, the first transistor T1 may be turned on, the second transistor T2 may be turned off, the driving current IDR generated by the pixel circuit PC (or by the third transistor T3 illustrated in FIG. 4) may be provided to the first light emitting element EL1, and the first light emitting element EL1 having the wide viewing angle may emit light based on the driving current IDR. Accordingly, in the first mode, an image displayed by the display device 100 may be visible to both of the first user USER1 and the second user USER2. However, in the second mode (e.g., the privacy mode), the first select signal SEL1 may be maintained at the off-level, and the second select signal SEL2 may be maintained at the on-level. Thus, the first transistor T1 may be turned off, the second transistor T2 may be turned on, the driving current IDR generated by the pixel circuit PC (or by the third transistor T3 illustrated in FIG. 4) may be provided to the second light emitting element EL2, and the second light emitting element EL2 having the narrow viewing angle may emit light based on the driving current IDR. Accordingly, in the second mode, the image displayed by the display device 100 may be visible to the first user USER1, but may be invisible to the second user USER2.

In some embodiments, each of all the pixels PX of the display panel 110 may include the first and second light emitting elements EL1 and EL2 having different viewing angles as illustrated in FIGS. 2 through 4. In some other embodiments, each of a portion of the pixels PX of the display panel 110 may include the first and second light emitting elements EL1 and EL2 having different viewing angles, and each of the remaining portion of the pixels PX may include only one light emitting element (e.g., the first light emitting element EL1).

Referring again to FIG. 1, the gamma reference voltage generator 130 may be controlled based on a gamma control signal GMACTRL received from the controller 190, and may generate the gamma reference voltages VGMA at a plurality of reference gray levels. In some embodiments, the gamma reference voltage generator 130 may generate first gamma reference voltages VGMA1 for the first light emitting element EL1 in the first mode, and may generate second gamma reference voltages VGMA2 for the second light emitting element EL2 in the second mode. For example, as illustrated in FIG. 5, the plurality of reference gray levels may be a 0-gray level, a 32-gray level, a 64-gray level, a 96-gray level, a 128-gray level, a 160-gray level, a 192-gray level, a 224-gray level, and a 255-gray level. The gamma reference voltage generator 130 may generate the first gamma reference voltages VGMA1_1, VGMA1_2, VGMA1_3, VGMA1_4, VGMA1_5, VGMA1_6, VGMA1_7, VGMA1_8 and VGMA1_9 at the 0, 32, 64, 96, 128, 160, 192, 224, and 255-gray levels, respectively, in the first mode. The gamma reference voltage generator 130 may generate the second gamma reference voltages VGMA2_1, VGMA2_2, VGMA2_3, VGMA2_4, VGMA2_5, VGMA2_6, VGMA2_7, VGMA2_8 and VGMA2_9 different from the first gamma reference voltages VGMA1 at the 0, 32, 64, 96, 128, 160, 192, 224 and 255-gray levels, respectively in the second mode. In some embodiments, the second light emitting element EL2 may have a higher luminous efficiency than the first light emitting element EL1, and the second gamma reference voltages VGMA2 may be higher than the first gamma reference voltages VGMA1 as illustrated in FIG. 5, but the present disclosure is not limited thereto.

The data driver 140 may receive the gamma reference voltages VGMA from the gamma reference voltage generator 130, and may receive output image data ODAT and a data control signal DCTRL from the controller 190. The data driver 140 may generate the data voltages VDAT based on the gamma reference voltages VGMA, the output image data ODAT, and the data control signal DCTRL, and may provide the data voltages VDAT to the plurality of pixels PX. In some embodiments, the data control signal DCTRL may include, but is not limited to, an output data enable signal, a horizontal start signal, and a load signal. Further, in some embodiments, in the first mode, the data driver 140 may receive the first gamma reference voltages VGMA1 for the first light emitting element EL1 from the gamma reference voltage generator 130, and may generate first data voltages VDAT1 for the first light emitting element EL1 based on the first gamma reference voltages VGMA1. In addition, in the second mode, the data driver 140 may receive the second gamma reference voltages VGMA2 for the second light emitting element EL2 from the gamma reference voltage generator 130, and may generate second data voltages VDAT2 for the second light emitting element EL2 based on the second gamma reference voltages VGMA2. For example, as illustrated in FIG. 5, the data driver 140 may generate the first data voltages VDAT1 at the entire (e.g., at each of the) gray levels (e.g., from the 0-gray level to the 255-gray level) by dividing the first gamma reference voltages VGMA1 at the plurality of reference gray levels in the first mode, and may generate the second data voltages VDAT2 at the entire gray levels by dividing the second gamma reference voltages VGMA2 at the plurality of reference gray levels in the second mode. Further, the data driver 140 may sequentially provide the first data voltages VDAT1 corresponding to the output image data ODAT among the first data voltages VDAT1 at the entire gray levels to the plurality of pixels PX on a row-by-row basis in the first mode, and may sequentially provide the second data voltages VDAT2 corresponding to the output image data ODAT among the second data voltages VDAT2 at the entire gray levels to the plurality of pixels PX on the row-by-row basis in the second mode. In some embodiments, the data driver 140 and the controller 190 may be implemented as a single integrated circuit, and the single integrated circuit may be referred to as a timing controller embedded data driver (TED). In some other embodiments, the data driver 140 and the controller 190 may be implemented as separate (e.g., distinct) integrated circuits.

The scan driver 150 may generate the scan signals SS based on a scan control signal SCTRL received from the controller 190, and may sequentially provide the scan signals SS to the plurality of pixels PX on the row-by-row basis. In some embodiments, the scan control signal SCTRL may include a scan start signal and a scan clock signal, but is not limited thereto. Further, in some embodiments, the scan driver 150 may sequentially provide the scan signals SS to the plurality of pixels PX on the row-by-row basis in each of the first mode and the second mode. In some embodiments, the scan signals SS applied to each pixel PX may include the write signal GW, the compensation signal GC, the initialization signal GI and the bypass signal GB, but are not limited thereto. Because the scan driver 150 sequentially provides the write signal GW to the plurality of pixels PX on the row-by-row basis, the data voltages VDAT generated by the data driver 140 may be sequentially provided to the plurality of pixels PX on the row-by-row basis. Further, in some embodiments, the scan driver 150 may be integrated or formed in the display panel 110. In other embodiments, the scan driver 150 may be implemented as an integrated circuit.

The emission driver 160 may generate the emission signals EM based on an emission control signal EMCTRL received from the controller 190, and may sequentially provide the emission signals EM to the plurality of pixels PX on the row-by-row basis. In some embodiments, the emission control signal EMCTRL may include, but is not limited to, an emission start signal and an emission clock signal. Further, in some embodiments, the emission driver 160 may sequentially provide the emission signals EM to the plurality of pixels PX on the row-by-row basis in each of the first mode and the second mode. Further, in some embodiments, the emission driver 160 may be integrated or formed in the display panel 110. In other embodiments, the emission driver 160 may be implemented as an integrated circuit.

The first select driver 170 may provide the first select signal SEL1 to the plurality of pixels PX based on a first select control signal SEL1_CTRL received from the controller 190. The second select driver 180 may provide the second select signal SEL2 to the plurality of pixels PX based on a second select control signal SEL2_CTRL received from the controller 190. In some embodiments, the first select control signal SEL1_CTRL may include, but is not limited to, a first select start signal SEL1_FLM, a first clock signal CLK1 and a second clock signal CLK2. In some embodiments, the second select control signal SEL2_CTRL may include, but is not limited to, a second select start signal SEL2_FLM, the first clock signal CLK1 and the second clock signal CLK2. Further, in some embodiments, in the first mode, the first select driver 170 may provide the first select signal SEL1 having the on-level (e.g., the low level) to the plurality of pixels PX such that the first light emitting elements EL1 of the plurality of pixels PX emit light, and the second select driver 180 may provide the second select signal SEL2 having the off-level (e.g., the high level) to the plurality of pixels PX such that the second light emitting elements EL2 of the plurality of pixels PX do not emit light. Further, in the second mode, the first select driver 170 may provide the first select signal SEL1 having the off-level to the plurality of pixels PX such that the first light emitting elements EL1 of the plurality of pixels PX do not emit light, and the second select driver 180 may provide the second select signal SEL2 having the on-level to the plurality of pixels PX such that the second light emitting elements EL2 of the plurality of pixels PX emit light.

In the display device 100 according to some embodiments, the panel driver 120 may sequentially provide the first select signal SEL1 and the second select signal SEL2 to the plurality of pixels PX on the row-by-row basis during a mode switching frame period between the first mode and the second mode. For example, in the mode switching frame period, the first select driver 170 may sequentially provide the first select signal SEL1 to the plurality of pixels PX on the row-by-row basis, and the second select driver 180 may sequentially provide the second select signal SEL2 to the plurality of pixels PX on the row-by-row basis. To perform these operations, in some embodiments, as illustrated in FIG. 6, the display panel 110 may include a plurality of pixel rows PXR1, PXR2, PXR3, PXR4, etc. In some embodiments, the first select driver 170 may include a plurality of first stages STG1_1, STG1_2, STG1_3, STG1_4, etc. that sequentially provide the first select signal SEL1_1, SEL1_2, SEL1_3, SEL1_4, etc. to the plurality of pixel rows PXR1, PXR2, PXR3, PXR4, etc. based on the first select start signal SEL1_FLM, the first clock signal CLK1 and the second clock signal CLK2. In some embodiments, the second select driver 180 may include a plurality of second stages STG2_1, STG2_2, STG2_3, STG2_4, etc. that sequentially provide the second select signal SEL2_1, SEL2_2, SEL2_3, SEL2_4, etc. to the plurality of pixel rows PXR1, PXR2, PXR3, PXR4, etc. For example, in the first select driver 170, a first-first stage STG1_1 may provide the first select signal SEL1_1 to a first pixel row PXR1 based on the first select start signal SEL1_FLM and the first clock signal CLK1, a first-second stage STG1_2 may provide the first select signal SEL1_2 to a second pixel row PXR2 based on the first select signal SEL1_1 for the first pixel row PXR1 and the second clock signal CLK2, a first-third stage STG1_3 may provide the first select signal SEL1_3 to a third pixel row PXR3 based on the first select signal SEL1_2 for the second pixel row PXR2 and the first clock signal CLK1, and a first-fourth stage STG1_4 may provide the first select signal SEL1_4 to the fourth pixel row PXR4 based on the first select signal SEL1_3 for the third pixel row PXR3 and the second clock signal CLK2. Further, in the second select driver 180, a second-first stage STG2_1 may provide the second select signal SEL2_1 to the first pixel row PXR1 based on the second select start signal SEL2_FLM and the first clock signal CLK1, a second-second stage STG2_2 may provide the second select signal SEL2_2 to the second pixel row PXR2 based on the second select signal SEL2_1 for the first pixel row PXR1 and the second clock signal CLK2, a second-third stage STG2_3 may provide the second select signal SEL2_3 to the third pixel row PXR3 based on the second select signal SEL2_2 for the second pixel row PXR2 and the first clock signal CLK1, and a second-fourth stage STG2_4 may provide the second select signal SEL2_4 to the fourth pixel row PXR4 based on the second select signal SEL2_3 for the third pixel row PXR3 and the second clock signal CLK2. Although FIG. 6 illustrates an example of configurations of the first and second select drivers 170 and 180, the first and second select drivers 170 and 180 are not limited to the example of FIG. 6, and may have any configuration that sequentially provides the first and second select signals SEL1 and SEL2 on the row-by-row basis.

Referring again to FIG. 1, the controller 190 (e.g., a timing controller) may receive input image data IDAT and a control signal CTRL from an external host processor (e.g., an application processor (AP), a graphics processing unit (GPU), a graphics card, etc.). In some embodiments, the control signal CTRL may include, but is not limited to, a vertical sync signal, a horizontal sync signal, an input data enable signal, a master clock signal, etc. The controller 190 may generate the output image data ODAT, the gamma control signal GMACTRL, the data control signal DCTRL, the scan control signal SCTRL, an emission control signal EMCTRL, the first select control signal SEL1_CTRL, and the second select control signal SEL2_CTRL based on the input image data IDAT and the control signal CTRL. The controller 190 may control the gamma reference voltage generator 130 by providing the gamma control signal GMACTRL to the gamma reference voltage generator 130, may control the data driver 140 by providing the output image data ODAT and the data control signal DCTRL to the data driver 140, and may control the scan driver 150 by providing the scan control signal SCTRL to the scan driver 150. Further, the controller 190 may control the emission driver 160 by providing the emission control signal EMCTRL to the emission driver 160, may control the first select driver 170 by providing the first select control signal SEL1_CTRL to the first select driver 170, and may control the second select driver 180 by providing the second select control signal SEL2_CTRL to the second select driver 180.

As described above, in the first mode of the display device 100 according to embodiments, the panel driver 120 may generate the first data voltages VDAT1 based on the first gamma reference voltages VGMA1 corresponding to the first mode, or the first gamma reference voltages VGMA1 for the first light emitting element EL1, and may sequentially provide the first data voltages VDAT1, the scan signals SS, and the emission signals EM to the plurality of pixels PX on the row-by-row basis in each frame period. Further, in the first mode, the panel driver 120 may provide the first select signal SEL1 having the on-level to the plurality of pixels PX, and may provide the second select signal SEL2 having the off-level to the plurality of pixels PX. Accordingly, in the first mode (e.g., the public mode), the first light emitting elements EL1 of the plurality of pixels PX may emit light, and the image displayed by the display device 100 may be viewed by both of the first and second users USER1 and USER2 positioned at the front and the side of the display device 100, respectively.

Further, in the second mode of the display device 100 according to embodiments, the panel driver 120 may generate the second data voltages VDAT2 based on the second gamma reference voltages VGMA2 corresponding to the second mode, or the second gamma reference voltages VGMA2 for the second light emitting elements EL2, and may sequentially provide the second data voltages VDAT2, the scan signals SS, and the emission signals EM to the plurality of pixels PX on the row-by-row basis in each frame period. Further, in the second mode, the panel driver 120 may provide the first select signal SEL1 having the off-level to the plurality of pixels PX, and may provide the second select signal SEL2 having the on-level to the plurality of pixels PX. Accordingly, in the second mode (e.g., the privacy mode), the second light emitting elements EL2 of the plurality of pixels PX may emit light, and an image displayed by the display device 100 may be visible to the first user USER1 positioned in front of the display device 100, but may be invisible to the second user USER2 positioned at the side of the display device 100.

In addition, in the display device 100 according to some embodiments, in a frame period between the first mode and the second mode, for example, in the mode switching frame period between the first mode and the second mode, the panel driver 120 may sequentially provide the first select signal SEL1 and the second select signal SEL2 to the plurality of pixels PX on the row-by-row basis. Accordingly, in the display device 100 according to some embodiments, mode switching between the first mode and the second mode may be sequentially performed on the row-by-row basis in the mode switching frame period.

As illustrated in FIG. 7, in a comparative example in which first and second global signals GS1 and GS2 are used instead of the first and second select signals SEL1 and SEL2 generated by the first and second select drivers 170 and 180, and the first and second global signals GS1 and GS2 are substantially simultaneously provided to a plurality of pixel rows PXR1, PXR2, PXR3, PXR4, etc. of a display panel 210, a luminance difference may occur between the plurality of pixel rows PXR1, PXR2, PXR3, PXR4, etc. of the display panel 210 when a mode of a display device including the display panel 210 is switched between the first mode and the second mode. For example, in the first mode, the first data voltages VDAT1 generated based on the first gamma reference voltages VGMA1 for the first light emitting elements EL1 may be provided to the plurality of pixel rows PXR1, PXR2, PXR3, PXR4, etc. of the display panel 210, and the first light emitting elements EL1 may emit light based on the first global signal GS1 and the first data voltages VDAT1. Further, when the mode of the display device using the first and second global signals GS1 and GS2 is switched from the first mode to the second mode, the display device may substantially simultaneously provide the second global signal GS2 for driving the second light emitting elements EL2 to the plurality of pixel rows PXR1, PXR2, PXR3, PXR4, etc., may generate the second gamma reference voltages VGMA2 for the second light emitting elements EL2, and may sequentially provide the second data voltages VDAT2 generated based on the second gamma reference voltages VGMA2 to the plurality of pixel rows PXR1, PXR2, PXR3, PXR4, etc. of the display panel 210 in each frame period FP1 and FP2. However, in a first frame period FP1 where the first mode is switched to the second mode, because the second data voltages VDAT2 are sequentially provided to the plurality of pixel rows PXR1, PXR2, PXR3, PXR4, etc. of the display panel 210, the second light emitting elements EL2 of some pixel rows PXR3, PXR4, etc. may emit light based on the first data voltages VDAT1 for the first light emitting elements EL1 at one time point of the first frame period FP1. For example, at a time point (e.g., time or point in time) of the first frame period FP1 after the second data voltages VDAT2 are provided to first and second pixel rows PXR1 and PXR2 and before the second data voltages VDAT2 are provided to the remaining pixel rows PXR3, PXR4, etc., the second light emitting elements EL2 of the first and second pixel rows PXR1 and PXR2 may emit light based on the second data voltages VDAT2 for the second light emitting elements EL2, but the second light emitting elements EL2 of the remaining pixel rows PXR3, PXR4, etc. may emit light based on the first data voltages VDAT1 for the first light emitting elements EL1 (i.e., the first data voltages VDAT1 generated based on the first gamma reference voltages VGMA1 for the first light emitting elements EL1). Accordingly, in a case where the first and second global signals GS1 and GS2 are used instead of the first and second select signals SEL1 and SEL2, at the time point of the first frame period FP1, the luminance difference may occur between the first and second pixel rows PXR1 and PXR2 and the remaining pixel rows PXR3, PXR4, etc. Further, in this case, a luminance difference may also occur between the first frame period FP1 and the subsequent frame period FP2.

However, the display device 100 according to some embodiments may not use the first and second global signals GS1 and GS2 that are substantially simultaneously provided to the plurality of pixels PX, but may sequentially provide the first and second select signals SEL1 and SEL2 to the plurality of pixels PX on the row-by-row basis in a frame period between the first mode and the second mode, or in the mode switching frame period between the first mode and the second mode.

For example, as illustrated in FIG. 8, in a case where the mode of the display device 100 is switched from the first mode MODE1 (e.g., the public mode PUBLIC MODE) to the second mode MODE2 (e.g., the privacy mode PRIVACY MODE), in a first mode switching frame period MSFP1 between the first mode MODE1 and the second mode MODE2, the gamma reference voltage generator 130 may generate the second gamma reference voltages VGMA2 corresponding to the second mode MODE2. Further, the data driver 140 may sequentially provide the second data voltages VDAT2 to the plurality of pixels PX on the row-by-row basis by generating the second data voltages VDAT2 based on the second gamma reference voltages VGMA2, and the first select driver 170 may sequentially provide the first select signal SEL1_1, SEL1_2, SEL1_3, SEL1_4, etc. having the off-level (e.g., the high level) to the plurality of pixels PX on the row-by-row basis based on the first select start signal SEL1_FLM, the first clock signal CLK1, and the second clock signal CLK2. The second select driver 180 may sequentially provide the second select signal SEL2_1, SEL2_2, SEL2_3, SEL2_4, etc. having the on-level (e.g., the low level) to the plurality of pixels PX on the row-by-row basis based on the second select start signal SEL2_FLM, the first clock signal CLK1, and the second clock signal CLK2.

For example, in the first mode switching frame period MSFP1 between the first mode MODE1 and the second mode MODE2, not only the second data voltages VDAT2 generated based on the second gamma reference voltages VGMA2 may be sequentially provided to the plurality of pixel rows PXR1, PXR2, PXR3, PXR4, etc. on the row-by-row basis, but also the first select signal SEL1 having the off-level and the second select signal SEL2 having the on-level may be sequentially provided to the plurality of pixel rows PXR1, PXR2, PXR3, PXR4, etc. on the row-by-row basis. Thus, at any time point of the first mode switching frame period MSFP1, as illustrated in FIG. 9, some pixel rows PXR1 and PXR2 that have already received the second data voltages VDAT2 may be driven such that the second light emitting elements EL2 emit light based on the second select signal SEL2 and the second data voltages VDAT2, and the remaining pixel rows PXR3, PXR4, etc. that have not yet received the second data voltages VDAT2 may be driven such that the first light emitting elements EL1 emit light based on the first select signal SEL1 and the first data voltages VDAT1. Accordingly, in the display device 100 according to embodiments, the luminance difference between the plurality of pixel rows PXR1, PXR2, PXR3, PXR4, etc. may not occur in the first mode switching frame period MSFP1, and a blinking phenomenon caused by the luminance difference during mode switching may be prevented or substantially reduced.

In another example, as illustrated in FIG. 10, when the mode of the display device 100 is switched from the second mode MODE2 (e.g., the privacy mode PRIVACY MODE) to the first mode MODE1 (e.g., the public mode PUBLIC MODE), in a second mode switching frame period MSFP2 between the second mode MODE2 and the first mode MODE1, the gamma reference voltage generator 130 may generate the first gamma reference voltages VGMA1 corresponding to the first mode MODE1. Further, the data driver 140 may sequentially provide the first data voltages VDAT1 to the plurality of pixels PX on the row-by-row basis by generating the first data voltages VDAT1 based on the first gamma reference voltages VGMA1, and the first select driver 170 may sequentially provide the first select signal SEL1_1, SEL1_2, SEL1_3, SEL1_4, etc. having the on-level (e.g., the low level) to the plurality of pixels PX on the row-by-row basis based on the first select start signal SEL1_FLM, the first clock signal CLK1, and the second clock signal CLK2. The second select driver 180 may sequentially provide the second select signal SEL2_1, SEL2_2, SEL2_3, SEL2_4, etc. having the off-level (e.g., the high level) to the plurality of pixels PX on the row-by-row basis based on the second select start signal SEL2_FLM, the first clock signal CLK1, and the second clock signal CLK2.

For example, in the second mode switching frame period MSFP2 between the second mode MODE2 and the first mode MODE1, not only the first data voltages VDAT1 generated based on the first gamma reference voltages VGMA1 may be sequentially provided to the plurality of pixel rows PXR1, PXR2, PXR3, PXR4, etc. on the row-by-row basis, but also the first select signal SEL1 having the on-level and the second select signal SEL2 having the off-level may be sequentially provided to the plurality of pixel rows PXR1, PXR2, PXR3, PXR4, etc. on the row-by-row basis. Thus, at any time point of the second mode switching frame period MSFP2, as illustrated in FIG. 11, some pixel rows PXR1 and PXR2 that have already received the first data voltages VDAT1 may be driven such that the first light emitting elements EL1 emit light based on the first select signal SEL1 and the first data voltages VDAT1, and the remaining pixel rows PXR3, PXR4, etc. that have not yet received the first data voltages VDAT1 may be driven such that the second light emitting elements EL2 emit light based on the second select signal SEL2 and the second data voltages VDAT2. Accordingly, in the display device 100 according to embodiments, the luminance difference between the plurality of pixel rows PXR1, PXR2, PXR3, PXR4, etc. may not occur in the second mode switching frame period MSFP2, and a blinking phenomenon caused by the luminance difference during mode switching may be prevented or substantially reduced.

In some other embodiments, as described below with reference to FIGS. 13 and 14, when a driving frequency for the display panel 110 is greater than or equal to a reference driving frequency, the panel driver 120 may provide a black data voltage VBLACK to the plurality of pixels PX such that all of the first light emitting elements EL1 and the second light emitting elements EL2 of the plurality of pixels PX do not emit light in each of the first and second mode switching frame periods MSFP1 and MSFP2. In this case, even if the display panel 110 is driven at a driving frequency greater than or equal to the reference driving frequency, a sufficient time period during which the gamma reference voltages VGMA are switched between the first gamma reference voltages VGMA1 and the second gamma reference voltages VGMA2 may be secured (e.g., provided).

As described above, in the display device 100 according to some embodiments, each of the plurality of pixels PX may include the first light emitting element EL1 and the second light emitting element EL2 having different viewing angles. In some embodiments, each of the plurality of pixels PX may drive the first light emitting element EL1 based on the first select signal SEL1, and may drive the second light emitting element EL2 based on the second select signal SEL2. Further, in the mode switching frame period between the first mode (e.g., the public mode) and the second mode (e.g., the privacy mode), the panel driver 120 may sequentially provide the first select signal SEL1 and the second select signal SEL2 to the plurality of pixels PX on the row-by-row basis. Accordingly, in the display device 100 according to embodiments, the blinking phenomenon during mode switching may be prevented or substantially reduced, and seamless mode switching may be performed.

Figure 12:
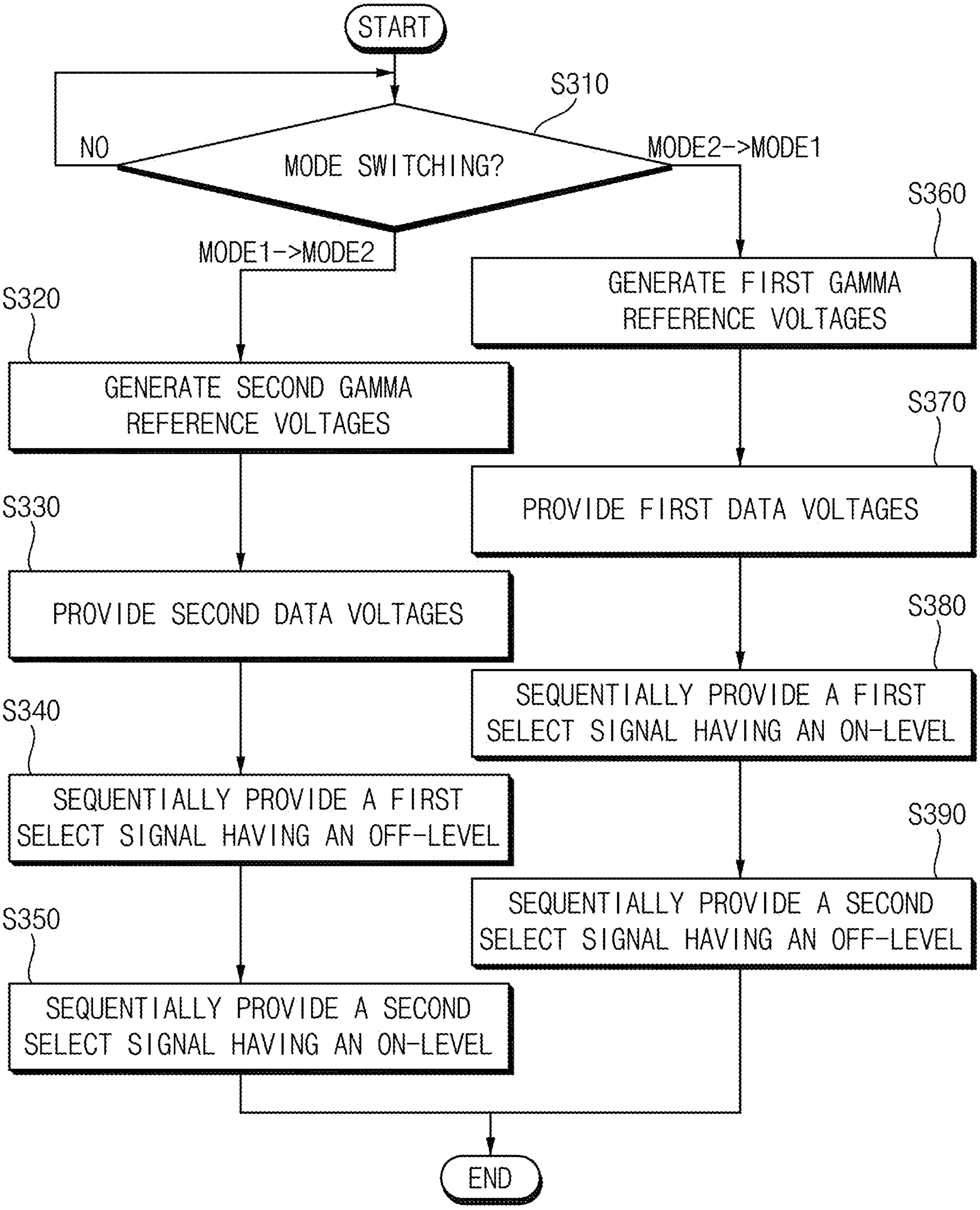
FIG. 12 is a flowchart illustrating a method of operating a display device according to some embodiments of the present disclosure.

FIG. 12 is a flowchart illustrating a method of operating a display device according to embodiments.

Referring to FIGS. 1, 2, 8, 9, 10, 11 and 12, in a method of operating a display device 100 in which each of a plurality of pixels PX includes a first light emitting element EL1 and a second light emitting element EL2 having different viewing angles, drives the first light emitting element EL1 based on a first select signal SEL1, and drives the second light emitting element EL2 based on a second select signal SEL2, it may be determined whether a mode of the display device 100 is switched (S310). If the mode of the display device 100 is not switched (e.g., S310: NO), the display device 100 may be driven in the existing mode. For example, in a first mode MODE1 (e.g., a public mode), a panel driver 120 may drive a display panel 110 such that the first light emitting elements EL1 having a wide viewing angle emit light, and an image displayed by the display device 100 may be viewed by both users positioned at the front and the side of the display device 100. In a second mode MODE2 (e.g., a privacy mode), the panel driver 120 may drive the display panel 110 such that the second light emitting elements EL2 having a narrow viewing angle emit light, and an image displayed by the display device 100 may be viewed by a user positioned in front of the display device 100, but may not be viewed by a user positioned at the side of the display device 100.

When the mode of the display device 100 is changed from the first mode MODE1 to the second mode MODE2 (S310: MODE1→MODE2), as illustrated in FIG. 8, in a first mode switching frame period MSFP1 between the first mode MODE1 and the second mode MODE2; a gamma reference voltage generator 130 may generate second gamma reference voltages VGMA2 corresponding to the second mode MODE2 (S320); a data driver 140 may sequentially provide second data voltages VDAT2 generated based on the second gamma reference voltages VGMA2 to the plurality of pixels PX on a row-by-row basis (S330); a first select driver 170 may sequentially provide a first select signal SEL1_1, SEL1_2, SEL1_3, SEL1_4, etc. having an off-level (e.g., a high level) to the plurality of pixels PX on the row-by-row basis (S340); and a second select driver 180 may sequentially provide a second select signals SEL2_1, SEL2_2, SEL2_3, SEL2_4, etc. having an on-level (e.g., a low level) to the plurality of pixels PX on the row-by-row basis (S350). Accordingly, as illustrated in FIG. 9, a luminance difference between a plurality of pixel rows PXR1, PXR2, PXR3, PXR4, etc. may not occur in the first mode switching frame period MSFP1, and a blinking phenomenon caused by the luminance difference during mode switching may be prevented or substantially reduced.

When the mode of the display device 100 is changed from the second mode MODE2 to the first mode MODE1 (S310: MODE2→MODE1), as illustrated in FIG. 10, in a second mode switching frame period MSFP2 between the second mode MODE2 and the first mode MODE1; the gamma reference voltage generator 130 may generate first gamma reference voltages VGMA1 corresponding to the first mode MODE1 (S360); the data driver 140 may sequentially provide first data voltages VDAT1 generated based on the first gamma reference voltages VGMA1 to the plurality of pixels PX on the row-by-row basis (S370); the first select driver 170 may sequentially provide the first select signal SEL1_1, SEL1_2, SEL1_3, SEL1_4, etc. having the on-level (e.g., the low level) to the plurality of pixels PX on the row-by-row basis (S380); and the second select driver 180 may sequentially provide the second select signal SEL2_1, SEL2_2, SEL2_3, SEL2_4, etc. having the off-level (e.g., the high level) to the plurality of pixels PX on the row-by-row basis (S390). Accordingly, as illustrated in FIG. 11, the luminance difference between the plurality of pixel rows PXR1, PXR2, PXR3, PXR4, etc. may not occur in the second mode switching frame period MSFP2, and a blinking phenomenon caused by the luminance difference during mode switching may be prevented or reduced.

As described above, in the method of operating the display device 100 according to some embodiments, in the mode switching frame period MSFP1 and MSFP2 between the first mode MODE1 and the second mode MODE2 (e.g., from the first mode MODE1 to the second mode MODE2 or vice versa), the panel driver 120 may sequentially provide the first select signal SEL1 and the second select signal SEL2 to the plurality of pixels PX on the row-by-row basis. Accordingly, the blinking phenomenon during mode switching may be prevented or substantially reduced, and substantially seamless mode switching may be performed.

Figure 13:
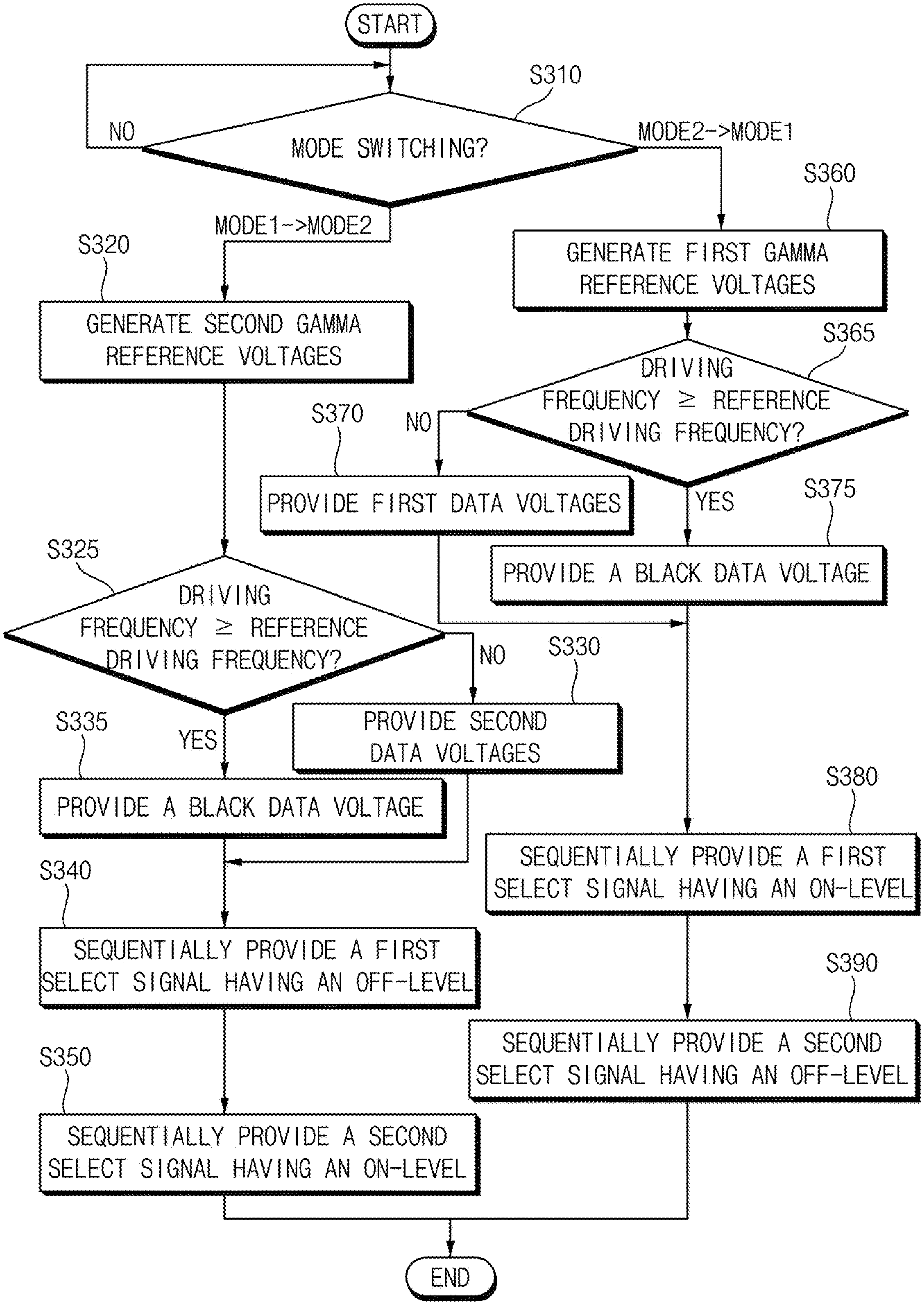
FIG. 13 is a flowchart illustrating a method of operating a display device according to some embodiments of the present disclosure.
Figure 14:
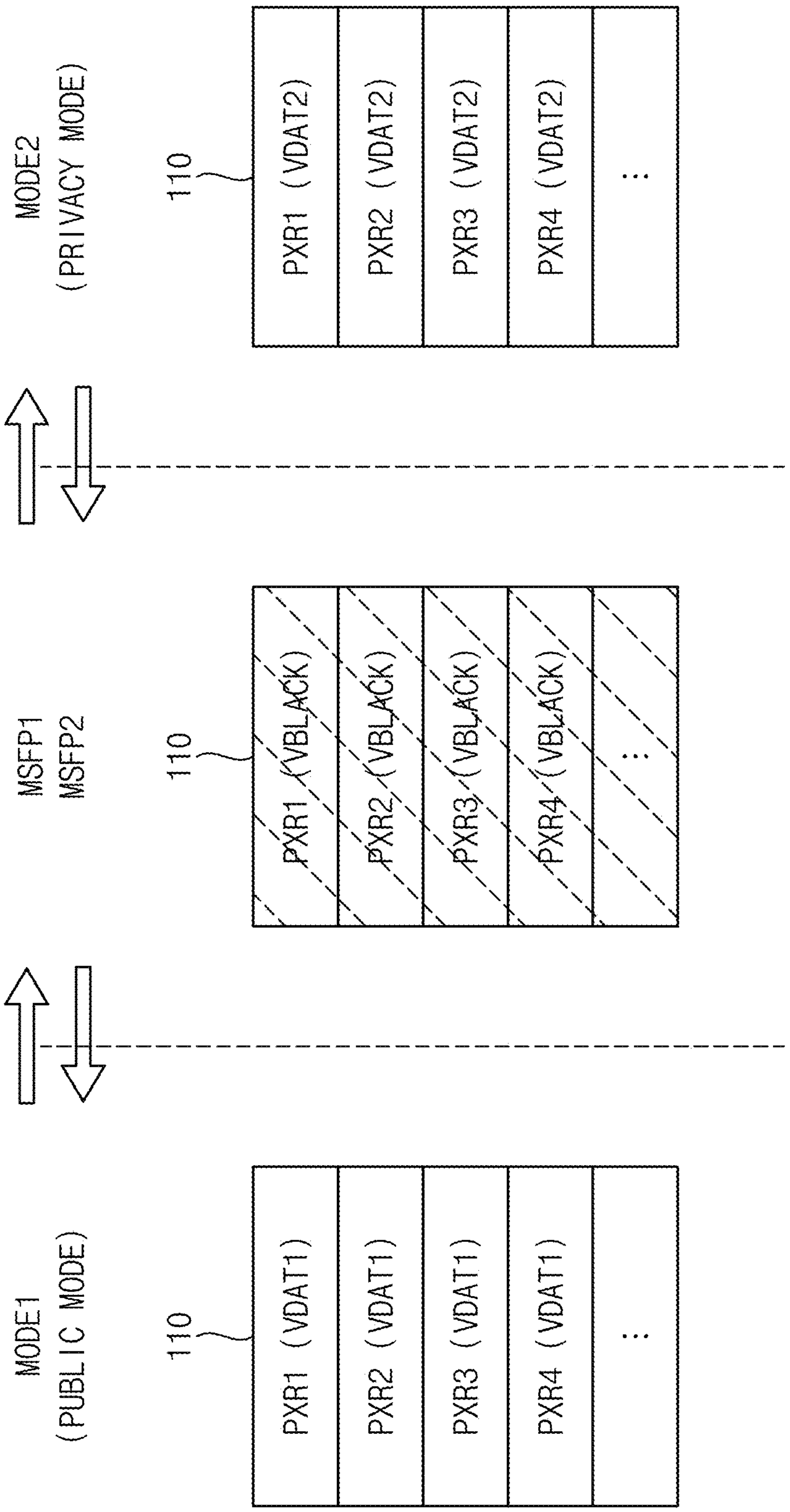
FIG. 14 is a diagram illustrating an example of an operation of a display device according to some embodiments of the present disclosure in a mode switching frame period between a first mode and a second mode.

FIG. 13 is a flowchart illustrating a method of operating a display device according to embodiments, and FIG. 14 is a diagram illustrating an example of an operation of a display device according to embodiments in a mode switching frame period between a first mode and a second mode.

A method of FIG. 13 may be similar to a method of FIG. 12, except that, when a driving frequency for a display panel is greater than or equal to a reference driving frequency, a black data voltage may be provided to a plurality of pixels in a mode switching frame period.

Referring to FIGS. 1, 2 and 13, in a method of operating a display device 100 in which each of a plurality of pixels PX includes a first light emitting element EL1 and a second light emitting element EL2 having different viewing angles, drives the first light emitting element EL1 based on a first select signal SEL1, and drives the second light emitting element EL2 based on a second select signal SEL2, it may be determined whether a mode of the display device 100 is switched (S310).

When the mode of the display device 100 is changed from a first mode MODE1 to a second mode MODE2 (S310: MODE1→MODE2), in a first mode switching frame period MSFP1 between the first mode MODE1 and the second mode MODE2, a gamma reference voltage generator 130 may generate second gamma reference voltages VGMA2 corresponding to the second mode MODE2 (S320). When a driving frequency for a display panel 110 is less than a reference driving frequency (S325: NO), the data driver 140 may sequentially provide second data voltages VDAT2 generated based on the second gamma reference voltages VGMA2 to the plurality of pixels PX on a row-by-row basis (S330). However, when the driving frequency for the display panel 110 is greater than or equal to the reference driving frequency (S325: YES), the data driver 140 may sequentially provide a black data voltage VBLACK to the plurality of pixels PX on the row-by-row basis (S335). Further, a first select driver 170 may sequentially provide a first select signal SEL1 having an off-level to the plurality of pixels PX on the row-by-row basis (S340), and a second select driver 180 may sequentially provide a second select signal SEL2 having an on-level to the plurality of pixels PX on the row-by-row basis (S350).

Accordingly, when the driving frequency for the display panel 110 is greater than or equal to the reference driving frequency (S325: YES), as illustrated in FIG. 14, in the first mode switching frame period MSFP1 between the first mode MODE1 and the second mode MODE2, all of the first light emitting elements EL1 and the second light emitting elements EL2 of a plurality of pixel rows PXR1, PXR2, PXR3, PXR4, etc. of the display panel 110 may sequentially not emit light on the row-by-row basis. In this case, not only the second light emitting elements EL2 may be substantially prevented from emitting light based on the first data voltages VDAT1 for the first light emitting elements EL1, but also a sufficient time period during which gamma reference voltages VGMA are switched from first gamma reference voltages VGMA1 to the second gamma reference voltages VGMA2 may be secured (e.g., provided).

When the mode of the display device 100 is changed from the second mode MODE2 to the first mode MODE1 (S310: MODE2→MODE1), in a second mode switching frame period MSFP2 between the second mode MODE2 and the first mode MODE1, the gamma reference voltage generator 130 may generate the first gamma reference voltages VGMA1 corresponding to the first mode MODE1 (S360). When the driving frequency for the display panel 110 is less than the reference driving frequency (S365: NO), the data driver 140 may sequentially provide the first data voltages VDAT1 generated based on the first gamma reference voltages VGMA1 to the plurality of pixels PX on the row-by-row basis (S370). However, when the driving frequency for the display panel 110 is greater than or equal to the reference driving frequency (S365: YES), the data driver 140 may sequentially provide the black data voltage VBLACK to the plurality of pixels PX on the row-by-row basis (S375). Further, the first select driver 170 may sequentially provide the first select signal SEL1 having the on-level to the plurality of pixels PX on the row-by-row basis (S380), and the second select driver 180 may sequentially provide the second select signal SEL2 having the off-level to the plurality of pixels PX on the row-by-row basis (S390).

Accordingly, when the driving frequency for the display panel 110 is greater than or equal to the reference driving frequency (S365: YES), as illustrated in FIG. 14, in the second mode switching frame period MSFP2 between the second mode MODE2 and the first mode MODE1, all of the first light emitting elements EL1 and the second light emitting elements EL2 of the plurality of pixel rows PXR1, PXR2, PXR3, PXR4, etc. of the display panel 110 may sequentially not emit light on the row-by-row basis. In this case, not only the first light emitting elements EL1 may be substantially prevented from emitting light based on the second data voltages VDAT2 for the second light emitting elements EL2, but also a sufficient time period during which gamma reference voltages VGMA are switched from the second gamma reference voltages VGMA2 to the first gamma reference voltages VGMA1 may be secured (e.g., provided).

Figure 15:
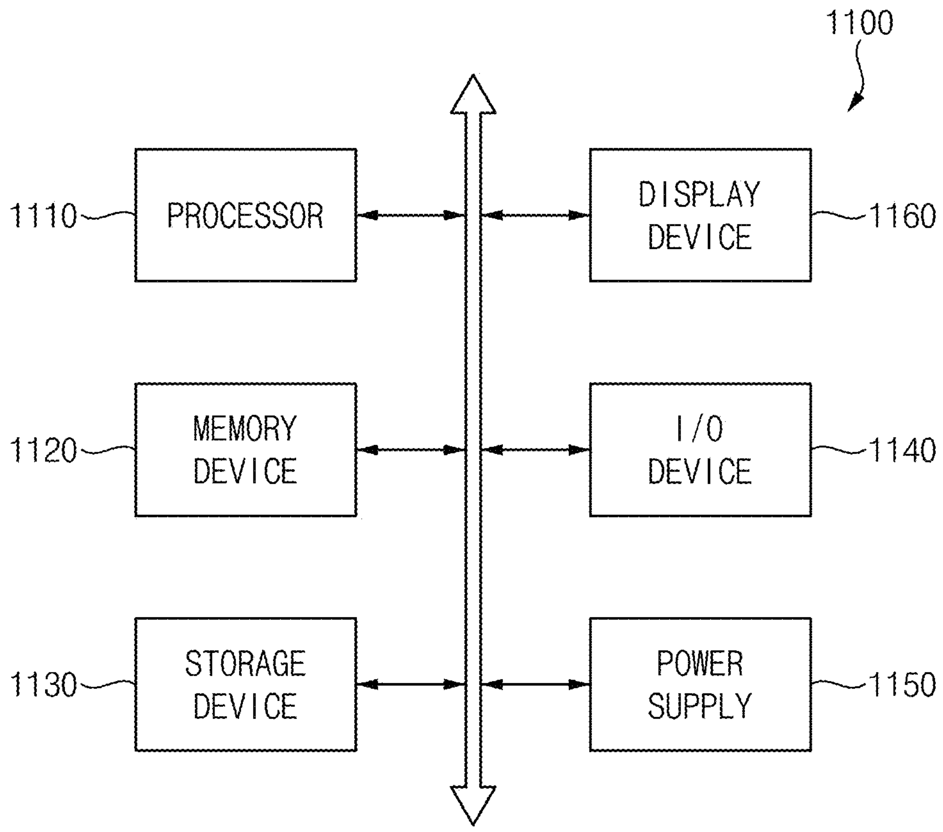
FIG. 15 is a block diagram illustrating an electronic device including a display device according to some embodiments of the present disclosure.

FIG. 15 is a block diagram illustrating an electronic device including a display device according to some embodiments.

Referring to FIG. 15, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus, such as a peripheral component interconnection (PCI) bus.

The memory device 1120 may store data for operations of the electronic device 1100. For example, the memory device 1120 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device, such as a keyboard, a keypad, a mouse, a touch screen, etc., and an output device such as a printer, a speaker, etc. The power supply 1150 may supply power for operations of the electronic device 1100. The display device 1160 may be coupled to other components via the buses or other communication links.

In the display device 1160, each of a plurality of pixels may include a first light emitting element and a second light emitting element having different viewing angles. Each of the plurality of pixels may drive the first light emitting element based on a first select signal, and may drive the second light emitting element based on a second select signal. Further, in a mode switching frame period between a first mode (e.g., a public mode) and a second mode (e.g., a privacy mode), a panel driver may sequentially provide the first select signal and the second select signal to the plurality of pixels on a row-by-row basis. Accordingly, blinking between the first and second modes may be prevented or substantially reduced, and substantially seamless mode switching may be performed.

According to some embodiments, the electronic device 1100 may be any electronic device including the display device 1160, such as a digital television, a three-dimensional (3D) television, a personal computer (PC) (e.g., a laptop computer, a tablet computer, etc.), a home appliance, a cellular phone, a smart phone, a wearable device, a personal digital assistant (PDA), a portable multimedia player (PMP), a digital camera, a music player, a portable game console, a navigation system, etc.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims and their equivalents.

What is claimed is:

1. A display device comprising:

a display panel comprising a plurality of pixels; and a panel driver configured to drive the display panel, wherein each of the plurality of pixels comprises:

a first light emitting element having a first viewing angle;

a second light emitting element having a second viewing angle different from the first viewing angle;

a pixel circuit configured to generate a driving current;

a first transistor configured to provide the driving current to the first light emitting element in response to a first select signal; and a second transistor configured to provide the driving current to the second light emitting element in response to a second select signal, and wherein, in a mode switching frame period between a first mode and a second mode, the panel driver is configured to sequentially provide the first select signal and the second select signal to the plurality of pixels on a row-by-row basis such that one of the first and second light emitting elements turns on and stays on for a remainder of the mode switching frame period and an other one of the first and second light emitting elements turns off and stays off for the remainder of the mode switching frame period.

2. The display device of claim 1, wherein the first mode is a public mode in which an image displayed by the display device is visible to both of a first user positioned in front of the display device and a second user positioned on a side of the display device, and wherein the second mode is a privacy mode in which an image displayed by the display device is visible to the first user and not visible to the second user.

3. The display device of claim 1, wherein the first light emitting element is a public light emitting element of which light is provided to both of a first user positioned in front of the display device and a second user positioned at a side of the display device, and wherein the second light emitting element is a privacy light emitting element of which light is provided to the first user and is not provided to the second user.

4. The display device of claim 1, wherein, in the first mode, the panel driver is configured to generate first data voltages for the plurality of pixels based on first gamma reference voltages corresponding to the first mode, and wherein, in the second mode, the panel driver is configured to generate second data voltages for the plurality of pixels based on second gamma reference voltages corresponding to the second mode.

5. The display device of claim 4, wherein, in the mode switching frame period in which a mode of the display device is switched from the first mode to the second mode, the panel driver is configured to generate the second data voltages for the plurality of pixels based on the second gamma reference voltages corresponding to the second mode.

6. The display device of claim 4, wherein, in the mode switching frame period in which a mode of the display device is switched from the second mode to the first mode, the panel driver is configured to generate the first data voltages for the plurality of pixels based on the first gamma reference voltages corresponding to the first mode.

7. The display device of claim 4, wherein, in a case where a driving frequency for the display panel is greater than or equal to a reference driving frequency, in the mode switching frame period, the panel driver is configured to provide a black data voltage to the plurality of pixels such that both of the first light emitting element and the second light emitting element of each of the plurality of pixels do not emit light.

8. The display device of claim 1, wherein, in the mode switching frame period in which a mode of the display device is switched from the first mode to the second mode, the panel driver is configured to generate second data voltages based on second gamma reference voltages corresponding to the second mode, to sequentially provide the second data voltages to the plurality of pixels on the row-by-row basis, to sequentially provide the first select signal having an off-level to the plurality of pixels on the row-by-row basis, and to sequentially provide the second select signal having an on-level to the plurality of pixels on the row-by-row basis.

9. The display device of claim 1, wherein, in the mode switching frame period in which a mode of the display device is switched from the second mode to the first mode, the panel driver is configured to generate first data voltages based on first gamma reference voltages corresponding to the first mode, to sequentially provide the first data voltages to the plurality of pixels on the row-by-row basis, to sequentially provide the first select signal having an on-level to the plurality of pixels on the row-by-row basis, and to sequentially provide the second select signal having an off-level to the plurality of pixels on the row-by-row basis.

10. The display device of claim 1, wherein, in the first mode, the first select signal is maintained at an on-level, and the second select signal is maintained at an off-level, and wherein, in the second mode, the first select signal is maintained at the off-level, and the second select signal is maintained at the on-level.

11. The display device of claim 1, wherein the pixel circuit comprises:

a third transistor comprising a gate, a first terminal connected to a first power supply voltage line, and a second terminal;

a fourth transistor comprising a gate connected to a write signal line, a first terminal connected to a data line, and a second terminal;

a first capacitor comprising a first electrode connected to the first power supply voltage line, and a second electrode connected to the second terminal of the fourth transistor;

a second capacitor comprising a first electrode connected to the second terminal of the fourth transistor, and a second electrode connected to the gate of the fourth transistor;

a fifth transistor comprising a gate connected to a compensation signal line, a first terminal connected to the second terminal of the third transistor, and a second terminal connected to the gate of the third transistor;

a sixth transistor comprising a gate connected to an initialization signal line, a first terminal connected to the gate of the third transistor, and a second terminal connected to an initialization voltage line;

a seventh transistor comprising a gate connected to the compensation signal line, a first terminal connected to the first electrode of the second capacitor, and a second terminal connected to a reference voltage line;

an eighth transistor comprising a gate connected to an emission signal line, a first terminal connected to the second terminal of the third transistor, and a second terminal connected to the first and second transistors;

a ninth transistor comprising a gate connected to a bypass signal line, a first terminal connected to the first light emitting element, and a second terminal connected to an anode initialization voltage line; and a tenth transistor comprising a gate connected to the bypass signal line, a first terminal connected to the second light emitting element, and a second terminal connected to the anode initialization voltage line, wherein the first transistor comprises a gate connected to a first select signal line which transfers the first select signal, a first terminal connected to the second terminal of the eighth transistor, and a second terminal connected to the first light emitting element, and wherein the second transistor comprises a gate connected to a second select signal line which transfers the second select signal, a first terminal connected to the second terminal of the eighth transistor, and a second terminal connected to the second light emitting element.

12. The display device of claim 1, wherein the panel driver comprises:

a gamma reference voltage generator configured to generate first gamma reference voltages in the first mode, and to generate second gamma reference voltages in the second mode;

a data driver configured to sequentially provide first data voltages generated based on the first gamma reference voltages to the plurality of pixels on the row-by-row basis in the first mode, and to sequentially provide second data voltages generated based on the second gamma reference voltages to the plurality of pixels on the row-by-row basis in the second mode;

a scan driver configured to sequentially provide scan signals to the plurality of pixels on the row-by-row basis in each of the first mode and the second mode;

a first select driver configured to provide the first select signal having an on-level to the plurality of pixels in the first mode, and to provide the first select signal having an off-level to the plurality of pixels in the second mode;

a second select driver configured to provide the second select signal having the off-level to the plurality of pixels in the first mode, and to provide the second select signal having the on-level to the plurality of pixels in the second mode; and a controller configured to control the gamma reference voltage generator, the data driver, the scan driver, the first select driver and the second select driver.

13. The display device of claim 12, wherein, in the mode switching frame period in which a mode of the display device is switched from the first mode to the second mode, the data driver is configured to sequentially provide the second data voltages generated based on the second gamma reference voltages to the plurality of pixels on the row-by-row basis, the first select driver is configured to sequentially provide the first select signal having the off-level to the plurality of pixels on the row-by-row basis, and the second select driver is configured to sequentially provide the second select signal having the on-level to the plurality of pixels on the row-by-row basis.

14. The display device of claim 12, wherein, in the mode switching frame period in which a mode of the display device is switched from the second mode to the first mode, the data driver is configured to sequentially provide the first data voltages generated based on the first gamma reference voltages to the plurality of pixels on the row-by-row basis, the first select driver is configured to sequentially provide the first select signal having the on-level to the plurality of pixels on the row-by-row basis, and the second select driver is configured to sequentially provide the second select signal having the off-level to the plurality of pixels on the row-by-row basis.

15. The display device of claim 1, wherein the display device is a vehicle display device mounted in a vehicle.

16. An electronic device comprising:

a processor configured to provide input image data; and a display device configured to receive the input image data from the processor, and to display an image based on the input image data, the display device comprising:

a display panel comprising a plurality of pixels;

a gamma reference voltage generator configured to generate first gamma reference voltages in a first mode, and to generate second gamma reference voltages in a second mode;

a data driver configured to sequentially provide first data voltages generated based on the first gamma reference voltages to the plurality of pixels on a row-by-row basis in the first mode, and to sequentially provide second data voltages generated based on the second gamma reference voltages to the plurality of pixels on the row-by-row basis in the second mode;

a scan driver configured to sequentially provide scan signals to the plurality of pixels on the row-by-row basis in each of the first mode and the second mode;

a first select driver configured to provide a first select signal having an on-level to the plurality of pixels in the first mode, and to provide the first select signal having an off-level to the plurality of pixels in the second mode;

a second select driver configured to provide a second select signal having the off-level to the plurality of pixels in the first mode, and to provide the second select signal having the on-level to the plurality of pixels in the second mode; and a controller configured to control the gamma reference voltage generator, the data driver, the scan driver, the first select driver, and the second select driver, wherein each of the plurality of pixels comprises:

a first light emitting element having a first viewing angle;

a second light emitting element having a second viewing angle different from the first viewing angle;

a pixel circuit configured to generate a driving current;

a first transistor configured to provide the driving current to the first light emitting element in response to the first select signal; and a second transistor configured to provide the driving current to the second light emitting element in response to the second select signal, and wherein, in a mode switching frame period between the first mode and the second mode, the first select driver is configured to sequentially provide the first select signal to the plurality of pixels on the row-by-row basis, and the second select driver is configured to sequentially provide the second select signal to the plurality of pixels on the row-by-row basis such that one of the first and second light emitting elements turns on and stays on for a remainder of the mode switching frame period and an other one of the first and second light emitting elements turns off and stays off for the remainder of the mode switching frame period.

17. The electronic device of claim 16, wherein, in the mode switching frame period in which a mode of the display device is switched from the first mode to the second mode, the gamma reference voltage generator is configured to generate the second gamma reference voltages, the data driver is configured to sequentially provide the second data voltages generated based on the second gamma reference voltages to the plurality of pixels on the row-by-row basis, the first select driver is configured to sequentially provide the first select signal having the off-level to the plurality of pixels on the row-by-row basis, and the second select driver is configured to sequentially provide the second select signal having the on-level to the plurality of pixels on the row-by-row basis.

18. The electronic device of claim 16, wherein, in the mode switching frame period in which a mode of the display device is switched from the second mode to the first mode, the gamma reference voltage generator is configured to generate the first gamma reference voltages, the data driver is configured to sequentially provide the first data voltages generated based on the first gamma reference voltages to the plurality of pixels on the row-by-row basis, the first select driver is configured to sequentially provide the first select signal having the on-level to the plurality of pixels on the row-by-row basis, and the second select driver is configured to sequentially provide the second select signal having the off-level to the plurality of pixels on the row-by-row basis.

19. The electronic device of claim 16, wherein, in a case where a driving frequency for the display panel is greater than or equal to a reference driving frequency, in the mode switching frame period in which a mode of the display device is switched from the first mode to the second mode, the gamma reference voltage generator is configured to generate the second gamma reference voltages, the data driver is configured to sequentially provide a black data voltage to the plurality of pixels on the row-by-row basis, the first select driver is configured to sequentially provide the first select signal having the off-level to the plurality of pixels on the row-by-row basis, and the second select driver is configured to sequentially provide the second select signal having the on-level to the plurality of pixels on the row-by-row basis, and wherein, in a case where the driving frequency for the display panel is greater than or equal to the reference driving frequency, in the mode switching frame period in which the mode of the display device is switched from the second mode to the first mode, the gamma reference voltage generator is configured to generate the first gamma reference voltages, the data driver is configured to sequentially provide the black data voltage to the plurality of pixels on the row-by-row basis, the first select driver is configured to sequentially provide the first select signal having the on-level to the plurality of pixels on the row-by-row basis, and the second select driver is configured to sequentially provide the second select signal having the off-level to the plurality of pixels on the row-by-row basis.

20. A method of operating a display device in which each of a plurality of pixels comprises a first light emitting element and a second light emitting element having different viewing angles, is configured to drive the first light emitting element based on a first select signal, and is configured to drive the second light emitting element based on a second select signal, the method comprising:

determining whether a mode of the display device is switched;

generating second gamma reference voltages corresponding to a second mode in a first mode switching frame period in which a mode of the display device is switched from a first mode to the second mode;

sequentially providing second data voltages generated based on the second gamma reference voltages to the plurality of pixels on a row-by-row basis in the first mode switching frame period;

sequentially providing the first select signal having an off-level to the plurality of pixels on the row-by-row basis in the first mode switching frame period such that one of the first and second light emitting elements turns on and stays on for a remainder of the mode switching frame period;

sequentially providing the second select signal having an on-level to the plurality of pixels on the row-by-row basis in the first mode switching frame period such that an other one of the first and second light emitting elements turns off and stays off for the remainder of the mode switching frame period;

generating first gamma reference voltages corresponding to the first mode in a second mode switching frame period in which the mode of the display device is switched from the second mode to the first mode;

sequentially providing first data voltages generated based on the first gamma reference voltages to the plurality of pixels on the row-by-row basis in the second mode switching frame period;

sequentially providing the first select signal having the on-level to the plurality of pixels on the row-by-row basis in the second mode switching frame period; and sequentially providing the second select signal having the off-level to the plurality of pixels on the row-by-row basis in the second mode switching frame period.

* * * * *